United States Patent [19]

Rossi et al.

[11] Patent Number: 5,554,310
[45] Date of Patent: Sep. 10, 1996

[54] TRISUBSTITUTED UNSATURATED POLYMERS

[75] Inventors: Albert Rossi, Warren, N.J.; Salvatore Rea, Franklin Square, N.Y.

[73] Assignee: Exxon Chemical Patents Inc., Linden, N.J.

[21] Appl. No.: 257,615

[22] Filed: Jun. 9, 1994

Related U.S. Application Data

[63] Continuation-in-part of Ser. No. 992,192, Dec. 17, 1992, abandoned.

[51] Int. Cl.$^6$ .................... C10M 107/08; C10M 143/00
[52] U.S. Cl. .................... 508/591; 585/10; 585/12; 585/13; 525/333.7; 508/452
[58] Field of Search .................... 585/10, 12, 13

[56] References Cited

U.S. PATENT DOCUMENTS

| | | | |
|---|---|---|---|
| Re. 26,433 | 8/1968 | Le Suer | 252/33.6 |
| 2,459,112 | 1/1949 | Oberright | 252/51.5 |
| 2,962,442 | 11/1960 | Andress | 252/51.5 |
| 2,984,550 | 5/1961 | Chamot | 44/62 |
| 3,036,003 | 5/1962 | Verdol | 252/33.4 |

(List continued on next page.)

FOREIGN PATENT DOCUMENTS

| | | | |
|---|---|---|---|
| 2021959 | 6/1991 | Canada . | |
| 129368 | 12/1984 | European Pat. Off. | C08F 10/00 |

(List continued on next page.)

OTHER PUBLICATIONS

"Macromolecules" Chapter 8, pp. 201–210 Laser Light Scattering, Chu, Benjamin, Academic Press, New York, 1974, Month N/A.

Walter Kaminsky, "Polymerization and Copolymerization with a Highly Active, Soluble Ziegler–Natta Catalyst", pp. 225–244, (1983), MMI Press Symposium Series, (Month N/A).

Encyclopedia of Polymer Science and Engineering vol. 11, John Wiley & Sons, New York, 1988 (pp. 26–27), Month N/A.

"The Study of Association and Aggregration Via Light Scattering" H. G. Elias, Chapter 9, in Huglin, M. B., editor Light Scattering from Polymer Solutions, Academic Press, New York, 1972, Month N/A.

"Light Scattering", Guy C. Berry Encyclopedia of Polymer Science and Engineering vol. 8, 2nd Edition, John Wiley & Sons, New York, 1987 (pp. 721–794), Month N/A.

Journal of Macromolecular Science—Reviews of Macromolecular Chemistry and Physics James C. Randall, C29, (pp. 201–317) 1989, Month N/A.

Eric T. Hsieh and James C. Randall Macromolecules, 15, (pp. 353–360) 1982, Month N/A.

"C13–NMR in Polymer Quantitative Analyses" J. C. Randall and E. T. Hsieh, in: NMR and Macromolecules, Sequence, Dynamic and Domain Structure ACS Symposium Series No. 247, (pp. 131–151) (American Chemical Society, 1984), Month N/A.

Periodic Table of the Elements (56th Edition of Handbook of Chemistry and Physics, CRC Press, 1975), Month N/A.

Textbook of Polymer Science John Wiley & Sons, 1984 Fred W. Billmeyer (pp. 198–202), Month N/A.

"Preparation and Clarification of Solutions", B. E. Tabor Chapter 1 in Huglin, M. B., editor Light Scattering from Polymer Solutions, Academic Press, New York 1972, Month N/A.

*Primary Examiner*—Ellen M. McAvoy
*Attorney, Agent, or Firm*—Harvey L. Cohen

[57] ABSTRACT

The invention pertains to olefinically unsaturated polymers wherein at least a portion of the olefinic unsaturation has three hydrocarbyl substituents attached to the two carbons of an olefinic unsaturation (i.e., trisubstituted vinyl). The invention is an $H_2C=CHR$ α-olefin polymer composition, wherein R is H or alkyl, with a substantial portion of the polymer unsaturation as trisubstituted.

21 Claims, 5 Drawing Sheets

U.S. PATENT DOCUMENTS

| | | | |
|---|---|---|---|
| 3,087,436 | 4/1963 | Dettlof et al. | 103/130 |
| 3,087,936 | 4/1963 | Le Suer | 260/326.3 |
| 3,150,088 | 9/1964 | Hunt et al. | 252/32.7 |
| 3,150,089 | 9/1964 | Hunt | 252/33 |
| 3,166,516 | 1/1965 | Kirkpatrick et al. | 252/344 |
| 3,172,892 | 3/1965 | Le Suer et al. | 260/326.5 |
| 3,185,645 | 5/1965 | Clayton | 252/46.7 |
| 3,215,707 | 11/1965 | Rense | 260/326.3 |
| 3,231,587 | 1/1966 | Rense | 260/346.8 |
| 3,236,770 | 2/1966 | Matson et al. | 252/32.7 |
| 3,245,908 | 4/1966 | Lowe | 252/51.5 |
| 3,245,910 | 4/1966 | Lowe | 252/51.5 |
| 3,254,025 | 5/1966 | LeSuer | 252/32.7 |
| 3,256,185 | 6/1966 | Le Suer | 252/32.7 |
| 3,271,310 | 9/1966 | Le Suer | 252/35 |
| 3,272,746 | 9/1966 | Le Suer et al. | 252/47.5 |
| 3,275,554 | 9/1966 | Wagenaar | 252/50 |
| 3,284,410 | 11/1966 | Meinhardt | 252/49.6 |
| 3,306,908 | 2/1967 | Le Suer | 260/326.3 |
| 3,316,177 | 4/1967 | Dorer | 252/51.5 |
| 3,326,804 | 6/1967 | Hu | 252/34 |
| 3,331,776 | 7/1967 | Krukziener | 252/56 |
| 3,355,270 | 11/1967 | Amick et al. | 44/68 |
| 3,361,673 | 1/1968 | Stuart et al. | 252/51.5 |
| 3,366,569 | 1/1968 | Norman et al. | 252/51.5 |
| 3,368,972 | 2/1968 | Otto | 252/47.5 |
| 3,373,111 | 3/1968 | Le Suer et al. | 252/51.5 |
| 3,381,022 | 4/1968 | Le Suer | 260/404.8 |
| 3,390,086 | 6/1968 | O'Halloran | 252/47.5 |
| 3,401,118 | 9/1968 | Benoit | 252/51.5 |
| 3,403,102 | 9/1968 | Le Suer | 252/49.8 |
| 3,413,347 | 11/1968 | Worrel | 260/570.5 |
| 3,415,750 | 12/1968 | Anzenberger | 252/51.5 |
| 3,438,757 | 4/1969 | Honnen et al. | 44/58 |
| 3,442,804 | 5/1969 | Traise et al. | 252/49.6 |
| 3,445,441 | 5/1969 | Rushton | 260/89.5 |
| 3,448,047 | 6/1969 | Traise et al. | 252/51.5 |
| 3,454,497 | 7/1969 | Wittner | 252/47.7 |
| 3,454,555 | 7/1969 | van der Voort et al. | 260/239 |
| 3,455,832 | 7/1969 | Davis | 252/51.5 |
| 3,459,661 | 8/1969 | Schlobohm | 252/42.7 |
| 3,461,172 | 8/1969 | Previc | 260/621 |
| 3,470,098 | 9/1969 | O'Halloran | 252/47.5 |
| 3,493,520 | 2/1970 | Verdol et al. | 252/51.5 |
| 3,513,093 | 5/1970 | Le Suer | 252/32.5 |
| 3,522,179 | 7/1970 | Le Suer | 252/51.5 |
| 3,533,945 | 10/1970 | Vogel | 252/49.6 |
| 3,539,633 | 11/1970 | Plasek et al. | 260/570.5 |
| 3,542,680 | 11/1970 | Le Suer | 252/57 |
| 3,551,466 | 12/1970 | Gee et al. | 260/429 |
| 3,558,743 | 1/1971 | Verdol et al. | 260/848 |
| 3,563,964 | 2/1971 | Wagensommer | 260/80.78 |
| 3,565,804 | 2/1971 | Honnen et al. | 252/50 |
| 3,573,205 | 3/1971 | Lowe et al. | 252/51.5 |
| 3,579,450 | 5/1971 | Le Suer | 252/56 |
| 3,586,629 | 6/1971 | Otto et al. | 252/42.7 |
| 3,591,598 | 7/1971 | Traise et al. | 260/296 |
| 3,600,372 | 8/1971 | Udelhofen et al. | 260/132 |
| 3,634,515 | 1/1972 | Plasek et al. | 260/570.5 PA |
| 3,649,229 | 3/1972 | Otto | 44/73 |
| 3,649,659 | 3/1972 | Otto et al. | 260/429 R |
| 3,660,057 | 5/1972 | Ilnyckyj | 585/12 |
| 3,697,428 | 10/1972 | Meinhardt et al. | 252/56 D |
| 3,697,429 | 10/1972 | Engel et al. | 252/59 |
| 3,697,574 | 10/1972 | Plasek et al. | 260/462 R |
| 3,718,663 | 2/1973 | Plasek et al. | 260/326.3 |
| 3,725,277 | 4/1973 | Worrell | 252/51.5 R |
| 3,725,480 | 4/1973 | Traise et al. | 260/583 P |
| 3,726,882 | 4/1973 | Traise et al. | 260/296 |
| 3,741,896 | 6/1973 | Abbott et al. | 252/42.7 |
| 3,755,169 | 8/1973 | Adams et al. | 252/35 |
| 3,755,433 | 8/1973 | Miller et al. | 252/51.5 R |
| 3,798,165 | 3/1974 | Plasek et al. | 252/51.5 R |
| 3,798,247 | 3/1974 | Plasek et al. | 260/404.5 |
| 3,822,209 | 7/1974 | Knapp et al. | 252/47 |
| 3,865,740 | 2/1975 | Goldschmidt | 252/46.7 |
| 3,912,764 | 10/1975 | Palmer | 260/346.8 |
| 4,076,738 | 2/1978 | Pecoraro | 260/406 |
| 4,102,798 | 7/1978 | Ryer et al. | 252/51.5 A |
| 4,110,349 | 8/1978 | Cohen | 260/346.74 |
| 4,113,639 | 9/1978 | Lonstrup et al. | 252/51.5 A |
| 4,116,876 | 9/1978 | Brois et al. | 252/49.6 |
| 4,152,499 | 5/1979 | Boerzel et al. | 526/52.4 |
| 4,160,739 | 7/1979 | Stambaugh et al. | 252/34 |
| 4,161,452 | 7/1979 | Stambaugh et al. | 252/34 |
| 4,171,273 | 10/1979 | Waldbillig et al. | 252/51.5 A |
| 4,173,185 | 11/1979 | Voegelin | 101/120 |
| 4,234,435 | 11/1980 | Meinhardt et al. | 252/51.5 A |
| 4,273,891 | 6/1981 | Pindar et al. | 525/145 |
| 4,306,041 | 12/1981 | Cozewith et al. | 526/68 |
| 4,454,059 | 6/1984 | Pindar et al. | 252/51.5 R |
| 4,517,104 | 5/1985 | Bloch et al. | 252/51.5 A |
| 4,540,753 | 9/1985 | Cozewith et al. | 526/88 |
| 4,540,756 | 9/1985 | Johnson | 526/124 |
| 4,542,199 | 9/1985 | Kaminsky et al. | 526/160 |
| 4,575,574 | 3/1986 | Kresge et al. | 585/520 |
| 4,665,208 | 5/1987 | Welborn et al. | 556/179 |
| 4,666,619 | 5/1987 | Kresge et al. | 252/56 S |
| 4,668,834 | 5/1987 | Rim et al. | 585/12 |
| 4,704,491 | 11/1987 | Tsutsui et al. | 585/10 |
| 4,797,219 | 1/1989 | Gutierrez et al. | 252/56 D |
| 4,832,702 | 5/1989 | Kummer et al. | 44/62 |
| 4,839,074 | 6/1989 | Rossi et al. | 252/56 D |
| 4,849,572 | 7/1989 | Chen et al. | 585/525 |
| 4,857,217 | 8/1989 | Gutierrez et al. | 252/47 |
| 4,859,210 | 8/1989 | Franz et al. | 44/53 |
| 4,863,623 | 9/1989 | Nalesnik | 252/50 |
| 4,871,705 | 10/1989 | Hoel | 502/117 |
| 4,925,579 | 5/1990 | Stemke | 252/32.7 E |
| 4,937,299 | 6/1990 | Ewen et al. | 526/119 |
| 4,943,658 | 7/1990 | Kinoshita et al. | 562/572.2 |
| 4,956,107 | 9/1990 | Gutierrez et al. | 252/47 |
| 4,963,275 | 10/1990 | Gutierrez et al. | 252/47 |
| 4,981,605 | 1/1991 | Tsutsui et al. | 252/52 A |
| 5,017,299 | 5/1991 | Gutierrez et al. | 252/51.5 R |
| 5,017,714 | 5/1991 | Welborn, Jr. | 556/12 |
| 5,043,515 | 8/1991 | Slaugh et al. | 585/512 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,084,197 | 1/1992 | Galic et al. | 252/52 A |
| 5,084,534 | 1/1992 | Welborn et al. | 526/160 |
| 5,096,867 | 3/1992 | Canich | 502/103 |
| 5,102,566 | 4/1992 | Fetterman et al. | 252/32.7 |
| 5,120,867 | 6/1992 | Welborn, Jr. | 556/12 |
| 5,124,056 | 6/1992 | Gutierrez et al. | 252/47 |
| 5,151,204 | 9/1992 | Struglinski | 585/12 |
| 5,153,157 | 10/1992 | Hlatky et al. | 502/117 |
| 5,198,401 | 3/1993 | Turner et al. | 502/155 |
| 5,219,480 | 6/1993 | Gutierrez et al. | 252/51.5 A |
| 5,225,092 | 7/1993 | Emert et al. | 252/50 |
| 5,227,440 | 7/1993 | Canich et al. | 526/129 |
| 5,229,022 | 7/1993 | Song et al. | 585/12 |
| 5,241,025 | 8/1993 | Hlatky et al. | 526/129 |
| 5,498,809 | 3/1996 | Emert et al. | 252/51.5 A |

FOREIGN PATENT DOCUMENTS

| | | | |
|---|---|---|---|
| 0260999 | 3/1988 | European Pat. Off. | |
| 277004 | 8/1988 | European Pat. Off. | C08F 4/64 |
| 277003 | 8/1988 | European Pat. Off. | C08F 4/64 |
| 353935 | 2/1990 | European Pat. Off. | C10M 129/93 |
| 0389722 | 10/1990 | European Pat. Off. | |

| | | | | | | |
|---|---|---|---|---|---|---|
| 420436 | 4/1991 | European Pat. Off. | C07F 7/00 | WO90/01503 | 2/1990 | WIPO . |
| 440506 | 8/1991 | European Pat. Off. . | | WO90/01503 | 2/1990 | WIPO . |
| 441548 | 8/1991 | European Pat. Off. . | | WO90/09371 | 8/1990 | WIPO . |
| 0441548A1 | 8/1991 | European Pat. Off. . | | WO90/10022 | 9/1990 | WIPO . |
| 0461744 | 12/1991 | European Pat. Off. . | | WO91/04257 | 4/1991 | WIPO . |
| 490454 | 6/1992 | European Pat. Off. . | | WO91/11488 | 8/1991 | WIPO . |
| 520732 | 12/1992 | European Pat. Off. . | | WO91/11469 | 8/1991 | WIPO . |
| 1-132605 | 5/1989 | Japan . | | WO92/00333 | 1/1992 | WIPO . |
| 984409 | 2/1965 | United Kingdom . | | WO93/08221 | 4/1993 | WIPO . |
| 1049291 | 11/1966 | United Kingdom . | | WO93/08199 | 4/1993 | WIPO . |
| 1329334 | 9/1973 | United Kingdom . | | WO93/24539 | 12/1993 | WIPO . |
| 1440219 | 6/1976 | United Kingdom . | | | | |

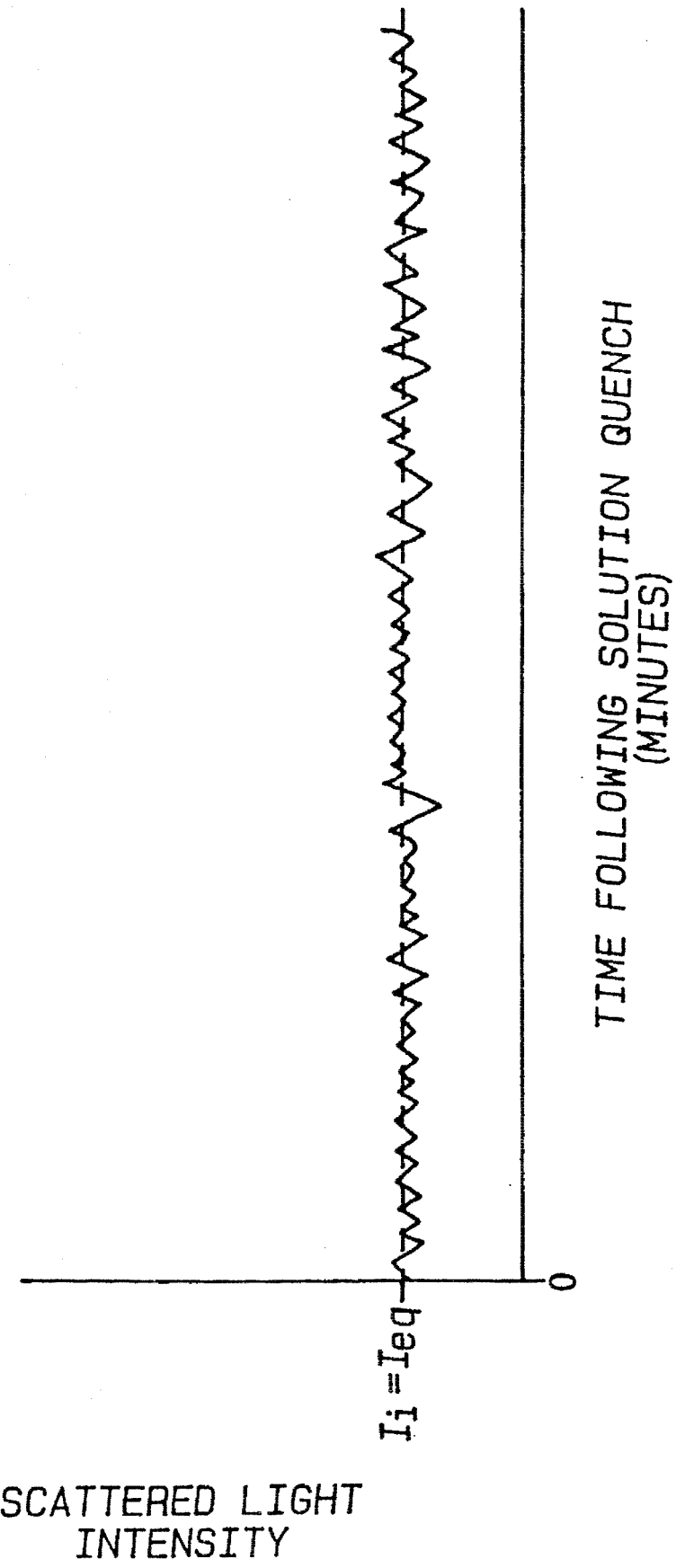

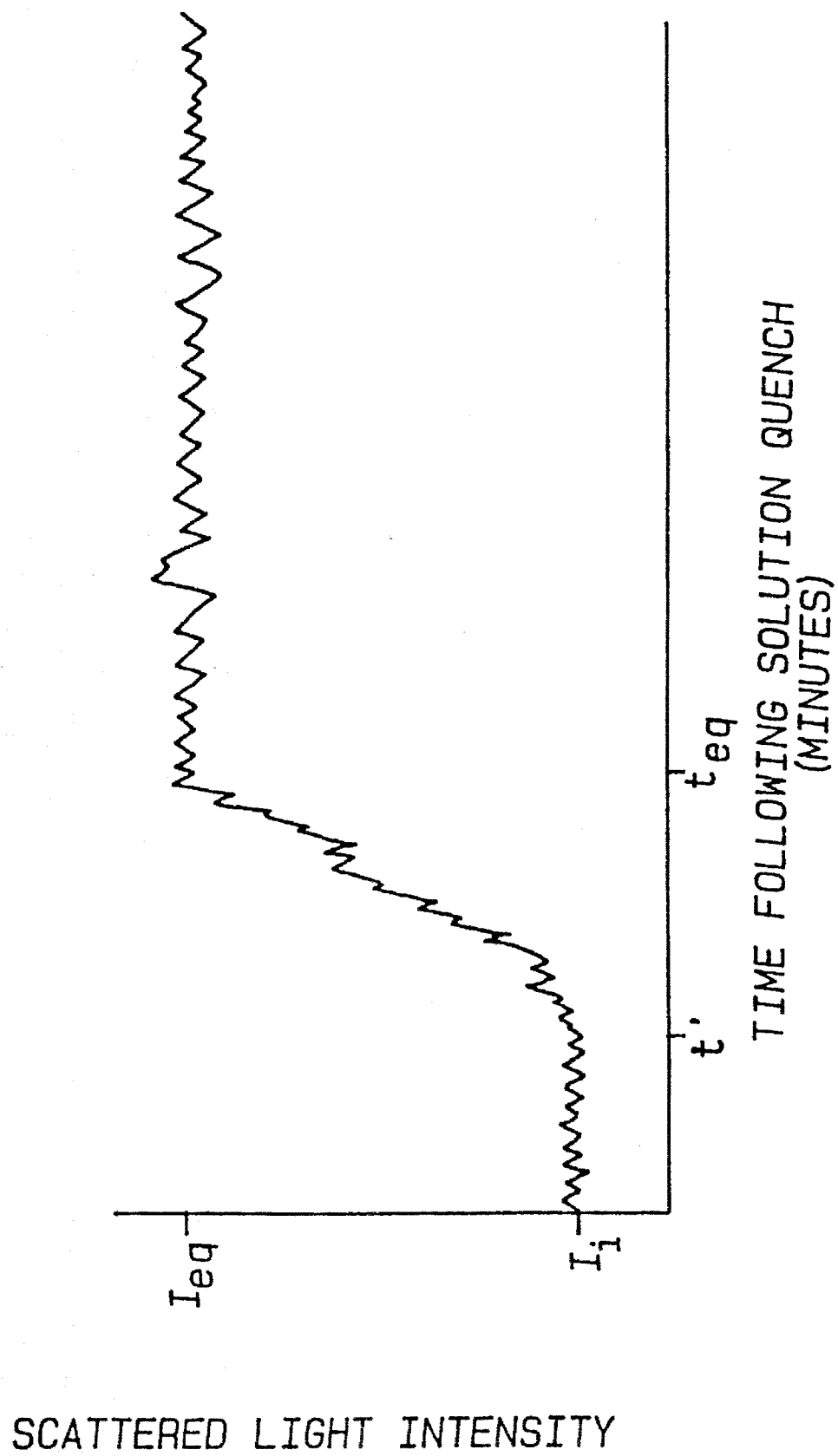

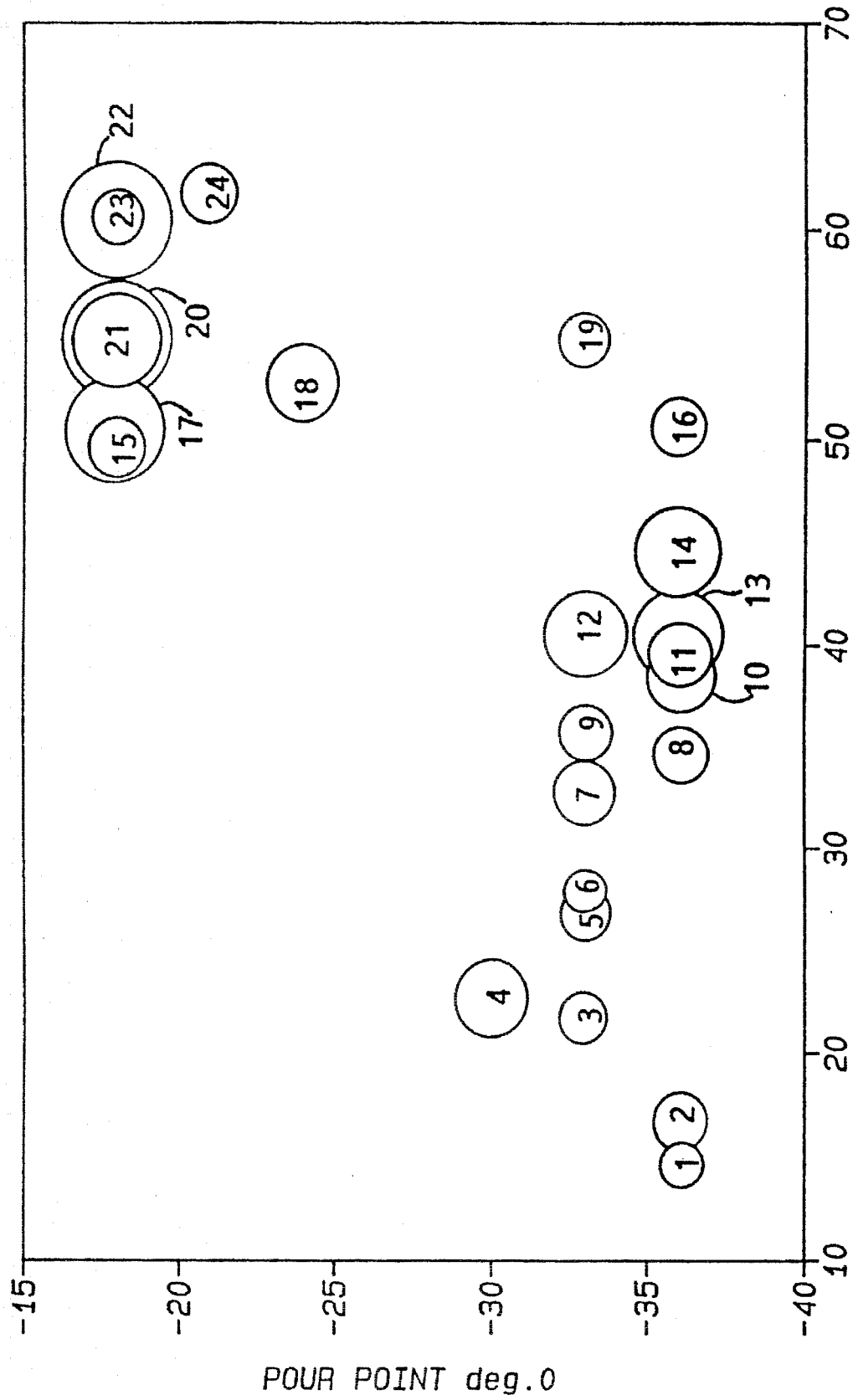

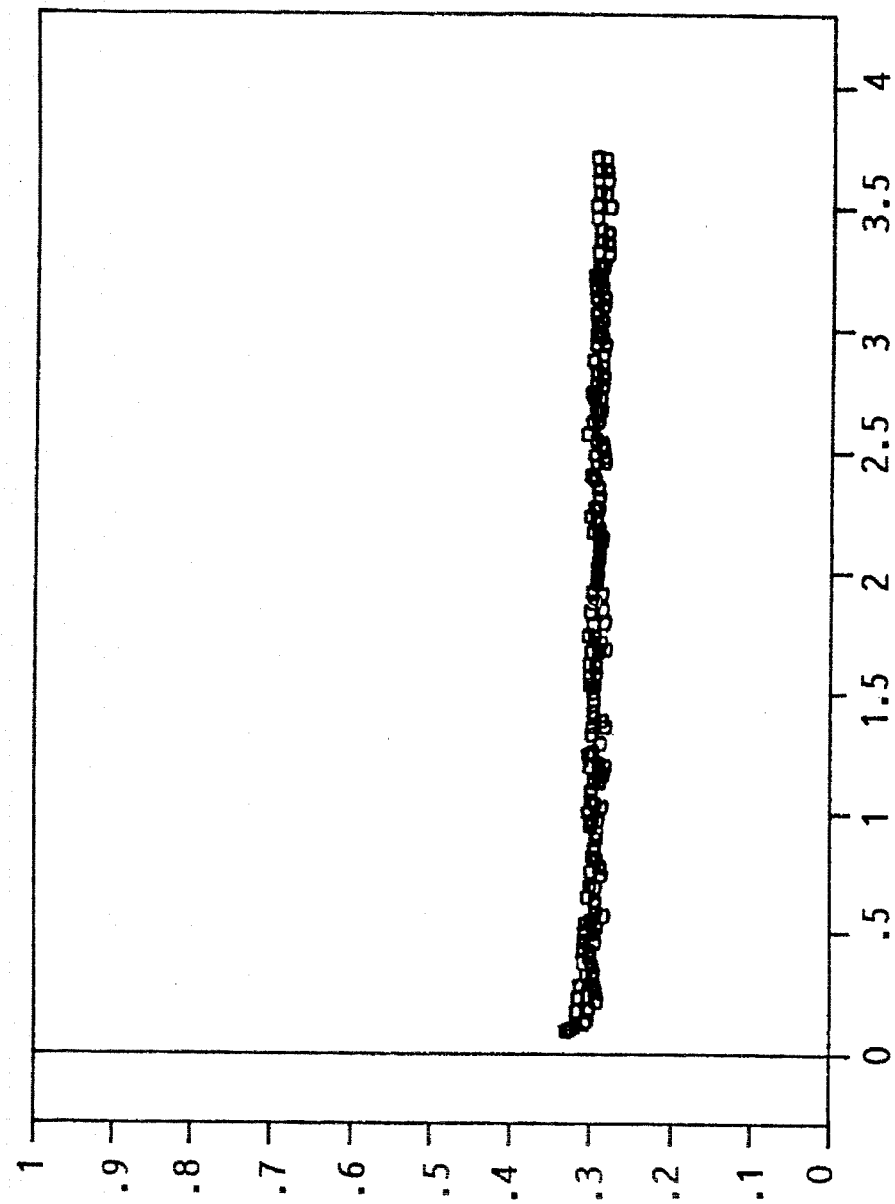

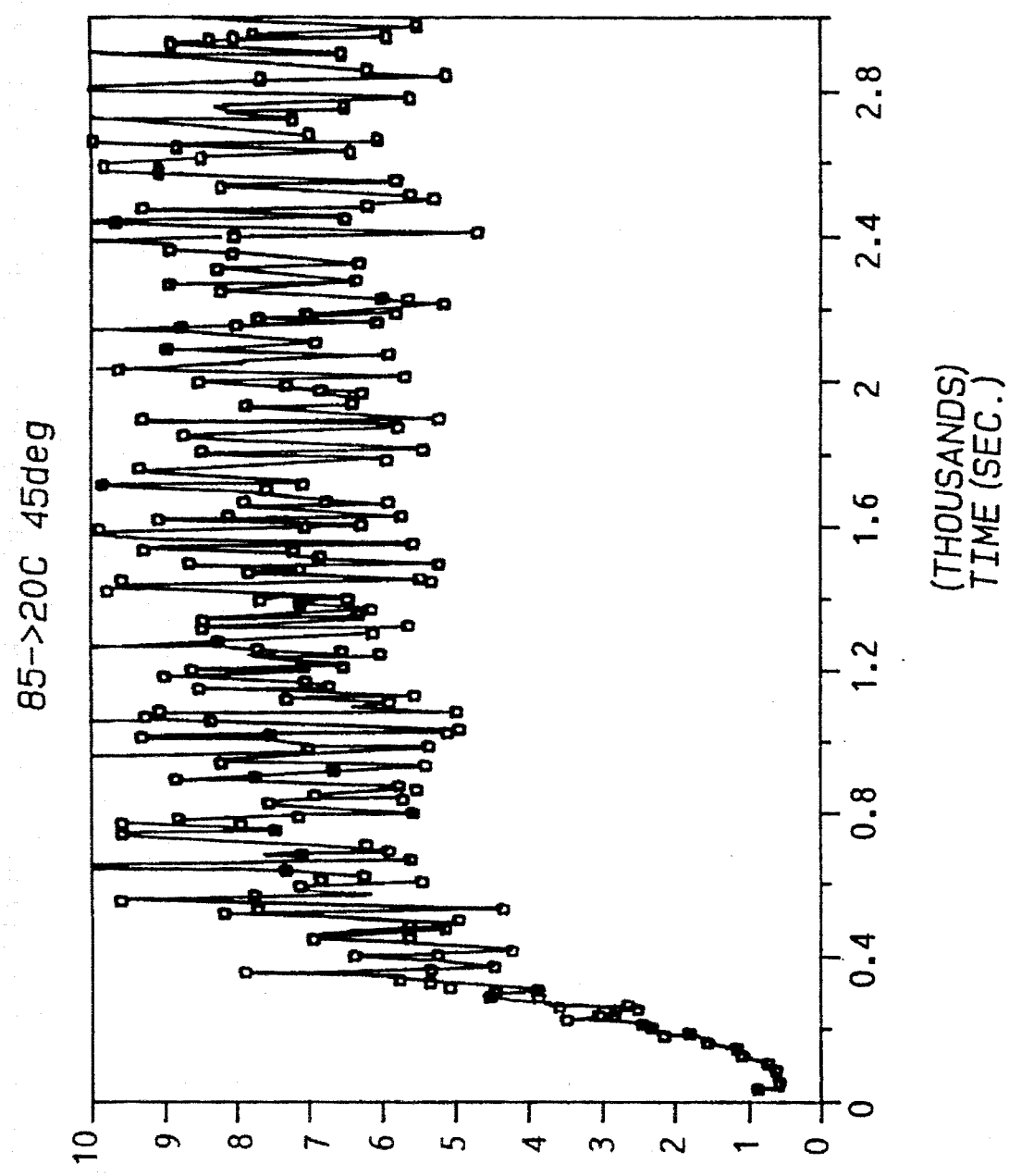

TRISUBSTITUTED UNSATURATED POLYMERS

CROSS REFERENCE

This application is a continuation-in-part of U.S. Ser. No. 992,192, filed Dec. 17, 1992, now abandoned for file wrapper continuation application Ser. No. 08/445,574, now U.S. Pat. No. 5,498,809.

This application is related to U.S. Ser. No. 08/257,614, Oil Soluble Additives Based on 1-Butene-Alpha-Olefin Copolymers and U.S. Ser. No. 08/257,398, Dilute Process for the Polymerization of Non-Ethylene α-Olefin Homopolymers and Copolymers Using Metallocene Catalyst Systems, filed of even date herewith.

FIELD OF THE INVENTION

The invention relates to polymers derived from ethylene and 1-butene which possess a certain combination of chemical and physical properties rendering the polymers particularly suitable as "polymer backbones" for the preparation of lubricating oil additives, particularly dispersants. The invention also relates to improved oil-soluble dispersant additives prepared from the polymers and useful in lubricating oil compositions, and to concentrates containing the oil-soluble dispersant additives.

This invention also relates in general to polymers and in particular to certain polymers having olefinic unsaturation wherein at least a portion of the olefinic unsaturation has three hydrocarbyl substituents attached to the two carbons of an olefinic unsaturation (trisubstituted).

BACKGROUND OF THE INVENTION

Hydrocarbon oil compositions typically comprise a mixture of at least one hydrocarbon base oil and one or more additives, e.g., dispersant additive, where each additive is employed for the purpose of improving the performance and properties of the base oil in its intended application; e.g., as a lubricating oil, heating oil, diesel oil, middle distillate fuel oil, and so forth.

Dispersants are typically polymeric materials with an oleophilic component providing oil solubility and a polar component providing dispersancy. Dispersants generally have a number average molecular weight ($\overline{M}_n$) of 10,000 or less.

Dispersants used in lubricating oils typically are hydrocarbon polymers modified to contain nitrogen- and ester-based groups. Polyisobutylene is commonly used in the preparation of dispersants, although other hydrocarbon polymers, such as ethylene-α-olefin copolymers, can be employed as well. Dispersants are primarily used to maintain in a suspension in the oil any insolubles formed by oxidation, etc. during use, thereby preventing sludge flocculation and precipitation. The amount of dispersant employed is dictated and controlled by the effectiveness of the particular material in achieving its dispersant function.

Nitrogen- and ester-based dispersants can be prepared by first functionalizing a long-chain hydrocarbon polymer, e.g., polyisobutylene, with maleic anhydride to form the corresponding polymer substituted with succinic anhydride groups, and then derivatizing the succinic anhydride-substituted polymer with an amine or an alcohol or the like. Polyisobutylene generally contains residual unsaturation in amounts of about one ethylenic double bond per polymer chain, positioned along the chain. The ethylenic double bonds serve as sites for functionalizing the polyisobutylenes by, for example, the thermal "ene" reaction (i.e., by direct reaction with maleic anhydride or one or more other dicarboxylic acid moieties).

The polyisobutylene (PIB) polymers employed in conventional dispersants typically have a $\overline{M}_n$ of from 900 to 2500. PIB having a $\overline{M}_n$ of less than 300 gives rather poor performance results when employed in dispersants because the molecular weight is insufficient to keep the dispersant molecule fully solubilized in lubricating oils. On the other hand, high molecular weight PIB ($\overline{M}_n$>3000) can be too viscous and difficult to process in many operations. This problem becomes much more severe as the PIB molecular weight increases to 5,000 or 10,000.

Increased amounts of terminal ethylenic unsaturation in polyisobutylene (so-called "reactive polyisobutylene") have been achieved by $BF_3$-catalyzed polymerization of isobutylene, such as disclosed in U.S. Pat. No. 4,152,499. Nonetheless, reactive polyisobutylenes can still contain substantial amounts of unsaturation elsewhere along the chain. Furthermore, it is difficult to produce reactive polyisobutylene polymers at molecular weights of greater than 2,000.

UK Patent 1329334 exemplifies the use of a conventional Ziegler-Natta catalyst for the preparation of ethylene-α-olefin copolymers of relatively low molecular weight. The patent discloses the production of ethylene polymer wax by polymerizing ethylene and optionally an α-olefin in the presence of hydrogen using a catalyst composed of a titanium or vanadium halogen compound supported on a carrier (a hydrocarbon-insoluble Mg compound) and an organoaluminum compound. The molecular weight and density of the polymer wax are controlled by the amount of hydrogen and/or α-olefin used in the polymerization. The polymer wax is disclosed to have a $M_n$ in the range of 400 to 20,000. The wax may be oxidized without the formation of cross-linkages due to the small content of double bonds in the wax, and the oxidized wax may be modified by reaction with a maleic acid compound. The patent contains an example disclosing the production of an ethylene-1-butene polymer wax containing 28 ethyl groups per 1000 carbon atoms, which is equivalent to about 94 mole % ethylene assuming the ethyl groups in the polymer are due to units derived from 1-butene.

Ethylene-α-olefin copolymers of low molecular weight and containing residual double-bond unsaturation have been prepared using a catalyst comprising a metallocene and an alumoxane. For example, U.S. Pat. No. 4,668,834 teaches ethylene-α-olefin copolymers and terpolymers having a $\overline{M}_n$ of between about 250 and about 20,000, a viscosity index of at least about 75, a vinylidene-type terminal unsaturation and molar ethylene content in the range of between about 20 and about 80. Propylene and 1-butene are specifically disclosed to be among the preferred α-olefins for polymerization with ethylene.

Similarly, U.S. Pat. No. 4,704,491 relates to liquid ethylene-α-olefin random copolymers which can be produced by copolymerizing ethylene and a $C_3$–$C_{20}$ α-olefin in the presence of a catalyst comprising a group IVb transition metal compound, such as a metallocene, and an aluminoxane. In addition to numerous examples directed to EP copolymers, the patent provides two examples of the preparation of EB copolymers by the polymerization of ethylene and 1-butene in the presence of zirconocene-aluminoxane catalyst systems. Example 6 discloses an EB copolymer having an ethylene content of 55 mole % (=38 wt. %) and an $\overline{M}_n$ of 1200. Example 14 discloses an EB copolymer with 60 mole % ethylene (43 wt. %) and $\overline{M}_n$ of 2300.

U.S. Pat. No. 5,043,515 teaches a zirconocene/aluminoxane catalyst for oligomerizing olefins and the oligomerization process using the catalyst. More particularly, the patent discloses the oligomerization of ethylene or ethylene with one or more $C_3$–$C_{10}$ α-olefins using the catalyst. It is further disclosed that, when the starting material is ethylene in combination with one or more α-olefins, the product olefins (i.e., the oligomers) contain significant portions of vinylidene olefins. Example 3–5 of the patent describes the oligomerization of ethylene and 1-butene using bis(cyclopentadienyl)zirconium dichloride and aluminoxane.

EP-A-353935, related to U.S. Pat. No. 5,229,022, is directed to oil-soluble lubricating oil additives comprising at least one terminally unsaturated ethylene-α-olefin polymer having a $\overline{M}_n$ of 300 to 10,000 substituted with mono- or dicarboxylic acid producing moieties, wherein at least about 30% of the polymer chains of the ethylene-α-olefin polymer possess terminal ethenylidene unsaturation. EP-A-441548 provides similar teachings for terminally unsaturated ethylene-α-olefin copolymers having $\overline{M}_n$s from about 300 to 20,000. EP-A-353935 further discloses that the monocarboxylic acid and the dicarboxylic acid or anhydride substituted polymers can be further reacted with a nucleophilic reagent such as amines, alcohols, amino alcohols and metal compounds, to form derivatives useful as lubricating oil additives such as dispersants. Example 5 discloses the preparation of an EB copolymer with $\overline{M}_n$=860 using dimethylsilyldicyclopentadienyl zirconium dichloride and methylalumoxane. The ethylene/butene-1 copolymers are prepared so as to provide polymer compositions having a low amount of the unsaturation as trisubstituted unsaturation (sometimes referred to as trisubstituted vinyl).

U.S. Pat. No. 4,981,605 relates to liquid epoxidized ethylenic random copolymers and to liquid hydroxylated ethylenic random copolymers, both of which are useful as lubricant oil additives, paint additives, and resin modifiers. The patent discloses that the epoxidized/hydroxylated ethylenic random copolymer is an epoxidation/hydroxylation product of a liquid ethylenic random copolymer of ethylene and a $C_3$–$C_{20}$ α-olefin, wherein the epoxy/hydroxyl groups are each formed via a carbon-carbon unsaturated bond derived from ethylene or the α-olefin and positioned at the polymer chain end of the liquid ethylenic random copolymer. The patent further discloses that the liquid ethylene random copolymer has, inter alia, an ethylene component content of 10–85 mole %, an α-olefin content of 15 to 90 mole %, a $\overline{M}_n$ of usually 200 to 10,000, and a molecular weight distribution of usually not more than 4.0. Referential Example 6 discloses the preparation of a liquid EB random copolymer with an ethylene content of 58 mole % (41 wt. %) and $M_n$ of 1500 by polymerization of ethylene and 1-butene in the presence of bis(cyclopentadienyl) zirconium dichloride and aluminoxane.

Other publications which relate primarily to the chemical modification of metallocene-alumoxane-prepared, low molecular weight ethylene-α-olefin copolymers to provide additives for lubricating oils include, for example, U.S. Pat. No. 4,943,658 and U.S. Pat. No. 5,017,299.

U.S. Pat. No. 5,084,534 discloses high molecular weight polyethylenes incorporating a small portion 1-octene, 1-hexene, or 1-butene.

U.S. Pat. No. 4,849,572 discloses polybutene $BF_3$ polymerization with immediate catalyst quench for high isobutylene conversion to PIB having at least 40% terminal unsaturation. Double bond types are discussed by varying hydrocarbon substitution.

It has been found that further improvements in the performance of ashless dispersants based on ethylene-α-olefin polymers, as well as significant improvements in the economics of the dispersants can be achieved by selectively controlling, for example, the specific co-monomer and its content and certain polymer properties, within the broad general class of ethylene-α-olefin copolymers.

SUMMARY OF THE INVENTION

The present invention is an unsaturated polymer composition of a $H_2C$=CHR α-olefin, wherein R is H or alkyl, wherein at least about 10% of the polymer unsaturation has three hydrocarbyl substituents on the two carbons of olefinic unsaturation.

Copolymers derived from ethylene and 1-butene (referred to as ethylene-1-butene copolymers or EB copolymers) are characterized by a complex set of properties: a $\overline{M}_n$ of from 1,500 to 7,500; at least 30% of all polymer chains terminated with ethylvinylidene groups; ethylene content of not greater than 50 wt. %; and capable of forming solutions in mineral oil which are free of polymer aggregates, as indicated by light scattering measurements. More particularly, the EB copolymers of the invention are characterized by forming mineral oil solutions which have values of zero for their light scattering factor, $S_f$, as hereinafter defined. The $S_f$ value of zero exhibited by these solutions shows that there is an absence of association or aggregation between individual EB polymer molecules dissolved in the mineral oil solutions. These aggregation-free mineral oil solutions of the EB copolymers of the invention may alternatively be referred to as homogeneous mineral oil solutions.

This combination of properties yields EB copolymers of the invention especially suitable for use as polymer backbones in lubricating oil additives, particularly dispersant additives. The limited range of $\overline{M}_n$ characterizing the EB copolymers of the present invention ensures that dispersants produced from the copolymers are fully solubilized in lubricating base oils, and, simultaneously, avoids or reduces handling problems due to high viscosity levels and wax crystal interactions. Because of the relatively high level of terminal ethylvinylidene unsaturation in the inventive EB copolymers, the dispersant additives produced therefrom have high active ingredient concentrations, thereby providing enhanced lubricating oil dispersancy, as exhibited by enhanced sludge and varnish control properties.

Furthermore, the polymers of the present invention and the dispersant additives produced therefrom, possess enhanced pour point performance in lubricating oil compositions to which they are added and which also contain conventional lubricating oil flow improvers (LOFI's). This beneficial pour point behavior of the dispersants is believed to be attributable in part not only to the ability of the EB copolymers to form homogeneous mineral oil solutions free of polymer aggregates as manifested by $S_f$ values of about zero, but also to the limited ethylene content. In contrast, EB copolymers with $S_f$ values greater than zero and/or ethylene contents in excess of about 50 wt. %, and dispersant additives produced therefrom, can exhibit an increase in the pour point of lubricating oil compositions in which they are used. Accordingly, in one of its aspects, this invention concerns lubricating oil compositions comprising a major amount of a lubricating base oil, an effective amount of a LOFI, and a minor amount of the EB copolymer of the present invention.

A further aspect of this invention relates to the EB copolymer functionalized with reactive groups, such as by substitution with mono- or dicarboxylic acid materials (i.e., acid, anhydride or acid ester) produced by reacting (e.g., by the "ene" reaction) the EB copolymers of the invention with mono-unsaturated carboxylic reactants. The monocarboxylic acid and the dicarboxylic acid or anhydride substituted EB copolymers are useful per se as additives to lubricating oils, and, in another aspect of this invention, can also be reacted with nucleophilic reagents, such as amines, alcohols, amino alcohols and metal compounds, to form derivative products which are also useful as lubricating oil additives, e.g., as dispersants.

In still another aspect of this invention, lubricating oil additives are produced by functionalizing the EB copolymers of the invention using reactants other than the mono-unsaturated carboxylic reactants heretofore described. Accordingly, the copolymer can be functionalized by reaction with a hydroxy aromatic compound in the presence of a catalytically effective amount of at least one acidic alkylation catalyst. Subsequently, the alkylated hydroxyaromatic compound can be reacted by Mannich Base condensation with an aldehyde and an amine reagent to provide a derivatized copolymer.

Lubricating oil additives within the scope of this invention are also produced by oxidation of the EB copolymer of the invention, such as oxidation with a gas containing oxygen and/or ozone. The copolymer can also be functionalized by hydroformylation and by epoxidation. The EB copolymers can also be functionalized by contacting the copolymers under Koch reaction conditions with carbon monoxide in the presence of an acidic catalyst and a nucleophilic trapping agent such as water or a hydroxy-containing compound or a thiol-containing compound to form carboxyl groups on the polymer. Furthermore, the aforesaid functionalized polymers formed by oxidation, hydroformylation, epoxidation, and Koch reaction can be derivatized by reaction with at least one derivatizing compound to form derivatized polymers.

BRIEF DESCRIPTION OF THE DRAWINGS

FIGS. 1A and 1B provide a schematic comparison of the light scattering behavior of the EB polymer of the invention with another EB polymer. FIG. 1A is a graphical plot of the scattered light intensity for a solution of the EB polymer of the present invention in S150NL mineral oil as a function of the time which has elapsed following the quenching of the solution from a temperature of about 80° C. or higher to 20° C., wherein the EB polymer forms a homogeneous solution with an absence of aggregates following the quench. FIG. 1-B is a comparative graphical plot of scattered light intensity data for a S150NL mineral oil solution of an EB polymer which forms a solution containing aggregates following the quench.

FIG. 2 is a plot of the pour points of the EB copolymers in Table IV of the Examples as a function of their wt. % ethylene content. The diameter of the circle marking the pour point of a given copolymer is proportional to its $\overline{M}_n$. The number associated with each circle is the sample number assigned to the copolymer in Table IV.

FIGS. 3A and 3B provide graphical plots of the scattered light intensity from solutions of EB polymer in S150NL mineral oil as a function of the time which has elapsed following the quenching of the solution from a temperature of about 80° C. to 20° C. FIG. 3A is a plot of the light scattering data for a sample of the EB copolymer prepared in Example 1, and FIG. 3B is a plot of the light scattering data for a sample of the EB copolymer prepared in Example 3B.

DETAILED DESCRIPTION OF THE INVENTION

The polymers of the present invention are derived by polymerization of at least one α-olefin of structure $H_2C=CHR$ wherein R is H (ethylene) or alkyl (higher alkenes). The α-olefins include ethylene, propylene, butene-1, pentene-1, hexene-1, heptene-1, octene-1, etc. The polymers may be homopolymers or interpolymers of two (copolymers) or more (terpolymers, etc.) monomers wherein one or more of the monomers is an α-olefin as described above. Other monomers such as internal olefins, dienes, or isoolefins may be included but polymers derived primarily from isoolefins are not included.

Ethylene/butene-1, ethylene/hexene-1, and ethylene/octene-1 copolymers are preferred because of the availability of monomers, ability to achieve medium-high trisubstituted content, and compatible properties. Propylene/butene-1, propylene/hexene-1, butene-1/hexene-1, etc. copolymers, terpolymers and higher interpolymers may also be prepared and used.

The polymers of the invention contain a structure

in the polymer chain, wherein one R is a hydrocarbyl substituent and the other R is H or hydrocarbyl, preferably H. When the other R is H the olefinic unsaturation in the polymer is referred to as trisubstituted; when the other R is a hydrocarbyl substituent, the olefinic unsaturation is referred to as tetrasubstituted. Such polymeric unsaturation is also sometimes referred to as included in internal unsaturation.

The olefinic unsaturation of the polymer compositions of the invention preferably have trisubstituted unsaturation as terminal unsaturation, near the end of the polymer chain. The exact structure is generally dependent on the α-olefin employed and catalyst used for polymerization, dictating the method of insertion of the monomer in the growing polymer chain. Thus, the preferred terminally unsaturated polymer compositions of the invention have the structure

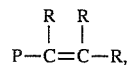

wherein P is the polymer chain, at least two R's are hydrocarbyl substituents, and the third R is H or hydrocarbyl. Thus the preferred invention with terminal trisubstituted unsaturation includes

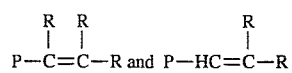

wherein the R's are all not H, preferably hydrocarbyl.

Ethylene/α-olefin interpolymers are preferred such as ethylene/butene-1 wherein the polymeric composition is produced so as to insert butene-1 monomers in such a fashion as to form terminal unsaturation as

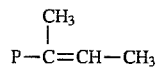

The polymer compositions of the present invention have at least about 10%, preferably about one-third, more preferably about 40% of their olefinic unsaturation as trisubstituted unsaturation and may be formed by any catalyst and process that provides them from one or more α-olefins, preferably predominantly from such α-olefins. The trisubstituted unsaturation of the polymer compositions is derived from the α-olefins and not predominantly from isoolefins, not having the structure $H_2C$=CHR wherein R is H or alkyl. The unsaturated polymer compositions of the invention have about 10%, conveniently about one third or more, sometimes preferably at least about 40%, of their unsaturation as trisubstituted unsaturation as described above. Vinylidene (ethylidene), vinyl, vinylene, and tetrasubstituted unsaturation may also be present. The unsaturation is preferably terminal such that the unsaturation is available for subsequent reactions. It is noted, however, that the trisubstituted is often more difficult to react (less readily converted) than e.g., vinylidene unsaturation although this characteristic may be used to advantage.

The preferred catalyst systems for preparing the polymer compositions of the invention are metallocene catalyst compositions. Bridged metallocene systems tend to produce higher levels of trisubstituted unsaturation for a given level of (co)monomer(s) at the same conditions. The unsaturated polymer compositions of the invention preferably have at least about 30% of their polymer chains containing unsaturation, more preferably about 50–90% or more of the chains contain at least one unsaturation. Thus, the polymers of the invention are characterized as unsaturated so that this feature is usable for controlled reaction of the trisubstituted double bonds (usually more difficult to react) or the other double bonds (more readily reactive), or for the non-reactive nature of the double bonds such as a diluent/nonreactant in basestocks. The tetrasubstituted olefinic unsaturations of the unsaturated polymer compositions of the invention may also be used for controlled reactivity. The tetrasubstituted olefinic unsaturation is generally less prevalent, usually present in only trace to minor amounts, e.g., 3% of the total unsaturation. Polymer compositions of the invention having at least about 10% of their olefinic unsaturation as trisubstituted are usable to produce dispersants, viscosity modifiers, and other useful materials while tending to retain a degree of olefinic unsaturation for subsequent or different reactions. Alternatively, the produced compositions may be applied where reduced reactivity is a benefit.

Conveniently, the polymer compositions of the invention having at least about one third of their unsaturation as trisubstituted may be used as above but also provide a material having significantly reduced reactivity. These are valuable as an oil extendor or for specific reactions to achieve multiple functionality on the polymer chains by a mild functionalization on vinylidene unsaturation followed by or in addition to a stronger functionalization of the trisubstituted unsaturation. The polymer compositions of the invention having at least about 40% of the olefinic unsaturation as trisubstituted may be used as above and are especially useful where the composition may be exposed to mild reagents/conditions that would functionalize vinylidene unsaturation while the trisubstituted unsaturation is preserved for a different or subsequent functionalization or isomerization.

The present invention relates to copolymers derived from ethylene and 1-butene characterized by a certain combination of chemical and physical properties which makes the copolymers especially suitable for use as the backbone of dispersant additives. More particularly, the EB copolymers of the invention possess a relatively high degree of terminal vinylidene unsaturation, a $\overline{M}_n$ within a limited range, controlled ethylene content, and the ability to form mineral oil solutions which have an absence of polymer aggregation. Each of these properties contributes in one or more respects to the utility of the copolymer as a dispersant backbone.

The EB copolymers of this invention possess a high degree of terminal vinylidene-type unsaturation. The EB copolymers chains are represented by the formula POLY—C(—$CH_2CH_3$)=$CH_2$, wherein POLY represents the polymer chain and —C(—$CH_2CH_3$)=$CH_2$ represents an ethylvinylidene group terminating one end of the chain. The EB copolymers typically have ethylvinylidene groups terminating at least 30% of the polymer chains; more preferably, at least 50% of the polymer chains, and most preferably at least 65% of the polymer chains, and typically from 50 to 75%. In addition, the copolymers typically have vinyl groups (i.e., POLY—CH=$CH_2$, where —CH=$CH_2$ is vinyl) terminating no more than 10% of the chains and internal mono-unsaturation in the balance of the chains. The internal mono-unsaturation typically includes vinylenes (i.e., POLY—CH=CHR, where the R may be cis or trans to the POLY) in amounts between 1 to 8% based upon total polymer unsaturation and trisubstituted vinyls in amounts between 20 and 50%. The percentage of polymer chains exhibiting terminal ethylvinylidene unsaturation, terminal vinyl unsaturation, etc. may be determined by Fourier transform infrared (FTIR) spectroscopic analysis, titration, or by C—13 NMR. It will be understood that a change in the type of metallocene catalyst or co-catalyst used to prepare the polymer can shift the above described double bond distribution to some extent. Because of the relatively high level of terminal ethylvinylidene unsaturation in the EB copolymers, the dispersant additives produced therefrom have high active ingredient concentrations, thereby providing enhanced lubricating oil dispersancy, as exhibited by enhanced sludge and varnish control properties.

The copolymers of this invention have a $\overline{M}_n$ of typically from 1,500 to 7,500, preferably from 1,500 to 6,000 (e.g., 1,500–5,000), and most preferably from 2,000 to 5,000 (e.g., 2,200 to 4,000). With regard to composition, the EB copolymer will typically contain not greater than 50, preferably not greater than 45, and most preferably not greater than 40 wt. % ethylene, based upon the total polymer weight. Thus, the ethylene content can range typically from 1 to 50 (e.g., from 5 to 50) wt. %, preferably from 5 to 45 (e.g., 5 to 35) wt. %, and most preferably from 10 to 35 (e.g., 10 to 30) wt. %. The balance of the copolymer content is substantially based upon units derived from 1-butene. Thus, the 1-butene content is typically from 99 to 50 (e.g., 95 to 50) wt. %, preferably from 95 to 55 (e.g., 95 to 65) wt. %, and most preferably from 90 to 65 (e.g., 90 to 70) wt. %. The copolymers of this invention may optionally contain small amounts (e.g., typically up to 10, preferably up to 5 wt. %) of units derived from other α-olefins and $C_3$ to $C_{22}$ diolefins. For example, introduction of small amounts of other $C_4$ olefins can result during the preparation of the EB copolymers through the use of 1-butene reactant streams which also contain certain amounts of 2-butene, isobutene, and/or butadiene.

The EB copolymers of the invention also form mineral oil solutions having an absence of aggregation, i.e., an absence of association between individual EB copolymer molecules dissolved in S150NL mineral oil at low concentration, typically 5 wt. %. More particularly, the EB copolymers of the invention form mineral oil solutions with an absence of aggregation at 20° C. after quenching of the solutions from a temperature of 80° C. or higher. This response is characterized by light scattering behavior, wherein these solutions have a value of zero for their light scattering factor $S_f$. EB copolymers of the present invention generally exhibit one or more beneficial or improved properties pertinent to their use in lubricating oils relative to those EB copolymers which exhibit aggregation. Furthermore, when the polymers of the present invention are used as polymer backbones in lubricating oil additives, particularly dispersant additives, the beneficial or improved properties of the polymer are imparted to the additive. For example, the non-aggregating nature of the EB copolymers of the invention is a sufficient condition for the acceptable pour point performance of the copolymers in mineral lubricating oils and for the acceptable pour point performance of additives obtained by functionalization or derivatization of the copolymers.

The state of aggregation of an EB copolymer in a mineral oil solution at 20° C. is determined from the value of its scattering factor $S_f$, as given by the following equation:

$$S_f = (I_{eq} - I_o)/I_o \qquad (I)$$

In equation (I), $I_o$ is the average initial intensity of the light scattered from a solution comprising from 1 to 10 wt. %, typically 5 wt. %, of the EB copolymer in S150NL (solvent 150 neutral light) mineral lubricating oil (Exxon Company U.S.A.) immediately after the solution has been quenched from a temperature of 80° C. or higher to a temperature of 20° C. $I_o$ is determined from the measurement of the scattered intensity at time t=0; i.e., immediately following the quench. $I_{eq}$ is the average intensity of the light scattered from the same solution, maintained at 20° C., after the elapse of at least a time $t = t_{eq}$ following the quench. As described more fully below, $t_{eq}$ is the time sufficient for the solution to achieve a constant (or "equilibrium") value of scattered light intensity following the quench.

The EB copolymers of the invention have a value of equal to or substantially zero for $S_f$, which means that the values for $I_{eq}$ and $I_o$ are essentially equivalent. In other words, the average intensity of the light scattered from a solution of 1 to 10 wt. % of an EB copolymer of the invention in S150NL oil, measured while maintaining the solution at a temperature of 20° C. after first quenching from a temperature of 80° C. or higher, does not change over the elapsed time following the quench. In contrast, EB copolymers having a tendency to aggregate in mineral oil solutions have an $S_f$ of greater than zero. For a solution comprising 1 to 10 wt. % of such an aggregating EB copolymer in S150NL oil, the average intensity of the light scattered from the solution is greater for times t equal to or greater than $t_{eq}$ following the quenching of the solution from 80° C. or higher to 20° C. than the average intensity immediately following the quench at time t=0.

FIGS. 1A and 1B provide a schematic comparison of the light scattering behavior of the EB copolymers of the invention with EB copolymers which have $S_f$ greater than zero. FIG. 1-A is a plot of the scattered light intensity in arbitrary units for a solution of the inventive EB copolymer in S150NL mineral oil at 20° C. as a function of the time elapsed since the quench. While there are random fluctuations in the measured values of the scattered intensity due to background noise, the average scattered intensity does not change with elapsed time. Thus, $I_o = I_{eq}$, and $S_f = 0$. FIG. 1-B is a plot analogous to FIG. 1-A, showing the scattered light intensity as a function of post-quench time for a solution of an EB copolymer having $S_f$ greater than zero. For a relatively short period of time immediately following the quench, the average scattered light intensity has a relatively low and constant value, essentially equal to $I_o$, the intensity at time t=0. There follows a time period in which the scattered light intensity measurably increases, shown in FIG. 1-B as the interval of time from t' up to $t_{eq}$. For the times greater or equal to $t_{eq}$, the average scattered intensity has a relatively high and constant (or "equilibrium") value, equal to $I_{eq}$. Thus, $I_{eq} > I_o$, and $S_f > 0$.

As noted earlier, the difference between the light scattering behavior of the EB copolymers of the invention, which have $S_f = 0$, and that of EB copolymers which have $S_f$ greater than zero is related to the degree of aggregation (also called self-association) of the copolymers in the S150NL mineral oil solution. It is known by those skilled in the art of polymer light scattering that, for a constant intensity of light incident on a dilute polymer solution which is maintained at a constant temperature and which has a fixed concentration (e.g., a fixed weight of solute per volume of solution), the scattered light intensity measured at a given scattering angle θ increases as the molecular weight of the polymer increases. (See, e.g., the discussion on pages 201–210 in Chapter 8 of Chu, Benjamin, *Laser Light Scattering*, Academic Press, New York, 1974). It is also known that, if the individual polymer molecules in a dilute solution aggregate in the solution, the scattered light intensity of the solution would be higher for a given concentration than it would be in the absence of the aggregation, due to the increase in the size of the scattering particles, or, in other words, due to an increase in the "apparent" molecular weight of the polymer particles. (See, e.g., Elias, H. G., "The Study of Association and Aggregation Via Light Scattering," Chapter 9 in Huglin, M. B., editor, *Light Scattering from Polymer Solutions*, Academic Press, New York, 1972).

Values of $t_{eq}$ for solutions of EB copolymers having $S_f$ greater than zero is determinable from, and indeed fixed by, the plot of scattered light intensity versus time. In measuring $I_o$ and $I_{eq}$ for these cases, the actual value of $t_{eq}$ is used. $t_{eq}$ is typically at least 5 min. and generally no more than 15 to 20 min. In a typical experiment, the scattered light intensity is measured several times per minute for up to at least 60 to 120 min. Taking measurements for these extended periods of time insures that EB copolymers having unusually long $t_{eq}$'s (e.g., 30 min.) are not missed. On the other hand, for solutions of the EB copolymer of the invention, it is neither possible nor necessary to determine the actual value of $t_{eq}$ from the plot of scattered light intensity versus post-quenching time, because the average scattering intensity does not change with time. Thus, in measuring $I_{eq}$ here, any convenient, arbitrarily chosen value of $t_{eq}$ may be used; e.g., 15 min. (Note, however, that measurements should be taken for at least 30 min. following the quench to insure the particular copolymer under test is not an aggregating copolymer with an unusually long $t_{eq}$.)

Values for $I_o$ and $I_{eq}$ may be measured using conventional elastic light scattering techniques, the practice of which has been described in a number of publications including Huglin, M. B., editor, *Light Scattering from Polymer Solutions*, Academic Press, New York, 1972. For the purposes of this invention, the critical determination is whether or not a change occurs in the scattered light intensity, as defined by $S_f$ in equation (I), as a function of time. Thus, it is not necessary to measure the scattering against a calibration standard or to otherwise determine the intensity in absolute terms. A preferred method of sample preparation involves adding to a suitable portion of S150NL mineral oil the amount of EB copolymer necessary to produce the desired concentration of the polymer in the oil (i.e., about 1 to 10 wt. %, typically 5 wt. %), agitating the polymer-oil combination for several hours, and then heating the polymer-oil mixture to a temperature of 80° to 90° C. and maintaining the mixture at that high temperature with occasional shaking until dissolution is complete. The solution is then maintained at 80° C. or higher for several more hours, and then filtered directly into the sample cell. The resulting dust-free solution still at 80° C. or higher is then immediately quenched by placement in the sample holder, thermostatted at 20° C., of the light scattering photometer, and the scattering intensity from the solution is monitored as a function of time in the manner already described.

Preferred EB copolymers of the invention may be further characterized by pour points of −30° C. or less, as determined by ASTM Method No. D97, wherein the measurements are made upon solutions comprising 2 wt. % of the EB copolymer of the invention and 0.2 wt. % of a conventional lube oil flow improver comprising a $C_8$–$C_{18}$ dialkyl fumarate-vinyl acetate copolymer in S150NL mineral lubricating oil. As noted earlier, the pour point of an oil composition is the lowest temperature at which it will flow when chilled in a specific manner; here, the manner prescribed by ASTM Method No. D97. Desirable lubricating oil compositions typically have a relatively low pour point, typically −30° C. or less. A requirement of any dispersant additive is that it not adversely affect (i.e., does not significantly increase) the pour point of the lubricating oil composition to which it is added. It has been found that the pour point behavior of dispersant additives is largely determined by the pour point behavior of the polymer from which they are derived. More particularly, it has been found that, if an EB copolymer in solution exhibits a pour point of −30° C. or less, as determined according to ASTM Method No. D97, the addition to a lubricating oil composition of an effective amount of a dispersant additive produced by the functionalization and/or derivatization, as hereinafter described, of the EB copolymer does not significantly alter the pour point of the composition.

Among the factors implicated in pour point performance are the ethylene content and the $\overline{M}_n$ of the polymer. FIG. 2 plots the pour points, measured according to ASTM Method No. D97, of a series of EB copolymers having ethylene contents ranging from 15 to 62 wt. % and $\overline{M}_n$s ranging from 1,627 to 12,432. These copolymers, some within the scope of the present invention and some not, were all prepared using the catalysts and processes as generally described hereinafter ("Preparation of the Ethylene-1-Butene Copolymer"). The data for the Figure are taken from Table IV of the Examples; each circle diameter is proportional to the $\overline{M}_n$ of the sample (sample number of Table IV). Based on these data, an EB copolymer which has an ethylene content of less than 50 wt. % and an $\overline{M}_n$ of up to 7,500 can be expected to have acceptable pour point behavior. Additionally, a polymer which has an ethylene content above 60 wt. % and $\overline{M}_n$ above 10,000 can be expected to have unacceptable pour point behavior. However, the pour point behavior of polymers having ethylene contents in the range from 50 to 60 wt. % appear to be unpredictable. For example, polymer sample number 16 (51 wt. % ethylene and $\overline{M}_n$=2,844) has a pour point of −36° C., but polymer sample number 15 (50 wt. % ethylene and $\overline{M}_n$=3,370) has a pour point of −18° C. Thus, it is believed that the 50–60 wt. % range of ethylene content represents a discontinuous transitional range, wherein it is possible to achieve good pour point behavior, but not on a predictable basis.

In view of FIG. 2, the advantages of the EB copolymers of the present invention over other EB copolymers depend to a degree upon the ethylene content and/or $\overline{M}_n$ of the other polymers. The present invention is directed to EB copolymers which have an ethylene content of not greater than 50 wt. %, a $\overline{M}_n$ of up to 7,500, and a tendency not to form aggregates in mineral oil solutions, as indicated by an $S_f$ value of zero. The advantage of the EB copolymers of the present invention over EB copolymers which have ethylene contents above 50 wt. % (regardless of $\overline{M}_n$) is the predictably acceptable pour point performance of the inventive copolymer. The advantage of the EB copolymers of the present invention over other EB copolymers which have ethylene contents below 50 wt. % and $\overline{M}_n$ up to 7,500 (and thus acceptable pour points) is the absence of aggregation in mineral oil solutions of the inventive copolymer. It is believed that this absence of aggregation exhibited by the EB copolymers of the present invention generally results in more predictable and less adverse interactions between the copolymers (and their functionalized and derivatized counterparts) and the mineral oil (e.g., interactions with the wax component of the mineral oil), relative to EB copolymers having ethylene contents and $\overline{M}_n$s in the same range, but exhibiting aggregation, as indicated by their non-zero $S_f$ values.

The EB copolymers of the invention preferably also have an average ethylene sequence length (ESL) of from 1 to 2.50. ESL is the ratio of the total number of ethylene units in the copolymer chains to the total number of discrete ethylene sequences in the copolymer chains, as given by the following equation (II):

$$ESL = (X_{EEE} + X_{BEE+EEB} + X_{BEB})/(X_{BEB} + 0.5 \cdot X_{BEE+EEB}) \quad \text{(II)}$$

wherein $X_{EEE}$ is the mole fraction of ethylene-ethylene-ethylene triad sequences in the copolymer; $X_{BEE+EEB}$ is the mole fraction of butene-ethylene-ethylene and ethylene-ethylene-butene triad sequences; and $X_{BEB}$ is the mole fraction of butene-ethylene-butene triad sequences. The ESL value is an index reflecting the distribution of the units derived from ethylene in the ethylene-1-butene copolymer chains. As the value for ESL increases for a given EB copolymer of fixed ethylene content, the number of isolated ethylene units in the chains declines, and, concomitantly, the number of ethylene units per ethylene sequence increases. Naturally, as the ethylene content increases in an EB copolymer containing even a random distribution of ethylene units, the general tendency is to obtain increased ESL values. As per equation (II), the ESL value of an EB copolymer can be calculated from $X_{EEE}$, $X_{BEE+EEB}$, and $X_{BEB}$, which are determined from the polymer's C—13 NMR spectrum, using the methods described in, for example, Randall, James C., Journal of Macromolecular Science—Reviews of Macromolecular Chemistry and Physics, C29, 201–317 (1989).

The copolymers of this invention preferably also have a molecular weight distribution (MWD), defined as the ratio of the weight average molecular weight ($\overline{M}_w$) to the $\overline{M}_n$ (i.e., MWD=$\overline{M}_w/\overline{M}_n$), of less than 5, preferably less than 4, and most preferably less than 3. More specifically, the copolymers have a molecular weight distribution of from 1.0 to 3.5, and most preferably from 1.1 to 3. Both $\overline{M}_n$ and $\overline{M}_w$ can be determined by the technique of gel permeation chromatography (GPC) with a suitable calibration curve, from which MWD can be readily obtained. $\overline{M}_n$ and MWD for ethylene-α-olefin copolymers, for example, can be obtained using calibration curves based upon polydisperse ethylene-α-olefin copolymers having ethylene contents similar to that of the samples under test. For a description of the determination of $\overline{M}_n$ and MWD using GPC (also known as size exclusion chromatography), see W. W. Yau, J. J. Kirkland and D. D. Bly, "Modern Size Exclusion Liquid Chromatography", John Wiley and Sons, New York, 1979. $\overline{M}_n$ can alternatively be determined for certain polymers such as ethylene-α-olefin copolymers from either their proton- or carbon-13 NMR spectra obtained in solution, using conventional analytical techniques known to those skilled in the art.

See, for example, "C13—NMR in Polymer Quantitative Analyses," J. C. Randall and E. T. Hsieh, in: *NMR and Macromolecules. Sequence, Dynamic, and Domain Structure*, ACS Symposium Series No. 247, 131–151 (American Chemical Society, 1984).

Preparation of the Ethylene-1-Butene Copolymer

Ethylene-1-butene copolymers of the present invention which have a relatively high degree of terminal ethylvinylidene unsaturation can be prepared by polymerizing monomer mixtures comprising ethylene and 1-butene in the presence of a catalyst system comprising at least one metallocene (e.g., a cyclopentadienyl-transition metal compound) and preferably an activator, e.g., an alumoxane compound. The term metallocene refers to compounds containing a coordination bond between a transition metal and at least one cyclopentadiene ring structure. The term cyclopentadiene ring structure includes saturated or unsaturated polycyclic structures such as indenyl and fluorenyl which incorporate a five-membered ring. The co-monomer content can be controlled through the selection of the metallocene catalyst component and by controlling the relative proportions of the ethylene and 1-butene. The preferred method and catalysts for preparing the EB copolymers are disclosed in commonly assigned copending U.S. Serial No. 992690, filed Dec. 17, 1992, entitled "Dilute Feed Process for the Polymerization of Ethylene-α-Olefin Copolymer Using Metallocene Catalyst System."

The catalyst is preferably a bulky ligand transition metal compound. The bulky ligand may contain a multiplicity of bonded atoms, preferably carbon atoms, forming a group which may be cyclic with one or more optional heteroatoms. The bulky ligand may be a cyclopentadienyl derivative which can be mono- or polynuclear. One or more bulky ligands may be bonded to the transition metal atom. The transition metal atom may be a Group IV, V or VI transition metal ("Group" refers to an identified group of the Periodic Table of Elements, comprehensively presented in "Advanced Inorganic Chemistry," F. A. Cotton, G. Wilkinson, Fifth Edition, 1988, John Wiley & Sons). Other ligands may be bonded to the transition metal, preferably detachable by a cocatalyst such as a hydrocarbyl or halogen leaving group. The catalyst is derivable from a compound of the formula $$[L]_m M[X]_n$$

wherein L is the bulky ligand, X is the leaving group, M is the transition metal and m and n are such that the total ligand valency corresponds to the transition metal valency. Preferably the catalyst is four coordinate such that the compound is ionizable to a $1^+$ valency state. The ligands L and X may be bridged to each other and if two ligands L and/or X are present, they may be bridged. The metallocenes may be full-sandwich compounds having two ligands L which are cyclopentadienyl groups or half-sandwich compounds having one ligand L only which is a cyclopentadienyl group.

For the purposes of this patent specification the term "metallocene" is defined to contain one or more cyclopentadienyl moiety in combination with a transition metal of the Periodic Table of Elements. In one embodiment the metallocene catalyst component is represented by the general formula $(Cp)_m MR_n R'_p$ wherein Cp is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m=1–3, n=0–3, p=0–3, and the sum of m+n+p equals the oxidation state of M. In another embodiment the metallocene catalyst is represented by the formulas:

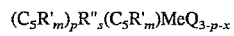

and

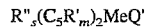

wherein Me is a Group IV, V, or VI transition metal $C_5R'_m$ is a substituted cyclopentadienyl each R', which can be the same or different is hydrogen, alkenyl aryl alkaryl or arylalkyl radical having from 1 to 20 carbon atoms or two carbon atoms joined together to form a part of a $C_4$ to $C_6$ ring, R" is one or more of or a combination of a carbon, a germanium, a silicon, a phosphorous or a nitrogen atom containing radical substituting on and bridging two $C_5R'_m$ rings or bridging one $C_5R'_m$ ring back to Me, when p=0 and x=1 otherwise x is always equal to 0, each Q which can be the same or different is an aryl alkyl, alkenyl, alkaryl, or arylalkyl radical having from 1 to 20 carbon atoms or halogen, Q' is an alkylidene radical having from 1 to 20 carbon atoms, s is 0 or 1 and when s is 0, m is 5 and p is 0, 1 or 2 and when s is 1, m is 4 and p is 1.

Various forms of the catalyst system of the metallocene type may be used in the polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen, et al. and EP-A-0129368 published Jul. 26, 1989, and U.S. Pat. Nos. 5,017,714 and 5,120,867 to Welborn, Jr. These publications teach the structure of the metallocene catalysts and include alumoxane as the cocatalyst. There are a variety of methods for preparing alumoxane, one of which is described in U.S. Pat. No. 4,665,208.

For the purposes of this patent specification, the terms "cocatalysts or activators" are used interchangeably and are defined to be any compound or component which can activate a bulky ligand transition metal compound. In one embodiment the activators generally contain a metal of Group II and III of the Periodic Table of Elements. In the preferred embodiment, the bulky transition metal compound are metallocenes, which are activated by trialkylaluminum compounds, alumoxanes both linear and cyclic, or ionizing ionic activators or compounds such as tri (n-butyl) ammonium tetra (pentafluorophenyl) boron, which ionize the neutral metallocene compound. Such ionizing compounds may contain an active proton, or some other cation associated with but not coordinated, or only loosely coordinated to the remaining ion of the ionizing ionic compound. Such compounds are described in EP-A-0520732, EP-A-0277003 and EP-A-0277004 published Aug. 3, 1988, and U.S. Pat. Nos. 5,153,157; 5,198,401 and 5,241,025. Further, the metallocene catalyst component can be a monocyclopentadienyl heteroatom containing compound. This heteroatom is activated by either an alumoxane or an ionic activator to form an active polymerization catalyst system to produce polymers useful in this invention. These types of catalyst systems are described in, for example, PCT International Publication WO 92/00333 published Jan. 9, 1992, U.S. Pat. Nos. 5,057,475; 5,096,867; 5,055,438 and 5,227,440 and EP-A-0420436, WO 91/04257. In addition, the metallocene catalysts useful in this invention can include non-cyclopentadienyl catalyst components, or ancillary ligands such as boroles or carbollides in combination with a transition metal. Additionally, it is not beyond the scope of this invention that the catalysts and catalyst systems may be those described in U.S. Pat. No. 5,064,802 and PCT publications WO 93/08221 and WO 93/08199 published Apr. 29, 1993. All the catalyst systems of the invention may be, optionally, prepolymerized or used in conjunction with an additive or scavenging component to enhance catalytic productivity.

The polymerization method and conditions may be as given in the related applications (above) or in other known manner but carried out so as to provide an unsaturated polymer composition with at least about 10 %, conveniently about one-third, desirably about 40% or more of the unsaturation or trisubstituted unsaturation, preferably terminal trisubstituted unsaturation. Both pure monomer feeds and dilute or mixed feeds may be used. For example, Raffinate I, Raffinate II, $C_3$ and $C_5$ dilute refinery streams may be used. Preferably, the polymerization reaction is carried out in the substantial absence of $H_2$, preferably less than 5 wppm based on the moles of monomer charged. In a batch reactor all ingredients should be dry (e.g., use of mole sieves) as the catalyst and cocatalyst are charged separately or together, preferably with agitation. Upon completion, unreacted monomer(s) and any solvent are flashed, distilled, or evacuated whereupon the polymer may be recovered. In a continuous reactor, residence times may be set to achieve molecular weight and conversion as desired. High pressure reactors are effectively used to provide the polymeric compositions of the invention, preferably with high proportions of terminal unsaturation as trisubstituted olefinic unsaturation.

Polymerization is generally conducted at temperatures of from 20° to 300° C., preferably from 30° to 200° C. Reaction time is not critical and may vary from several hours or more to several minutes or less, depending upon factors such as reaction temperature and the like. One of ordinary skill in the art may readily obtain the optimum reaction time for a given set of reaction parameters by routine experimentation. The catalyst systems described herein are suitable for the polymerization of ethylene and 1-butene in solution over a wide range of pressures. The polymerization can be completed at a pressure of from 10 to 3,000 bar. After polymerization and, optionally, deactivation of the catalyst (e.g., by conventional techniques such as contacting the polymerization reaction medium with water or an alcohol, such as methanol, propanol, isopropanol, etc., or cooling or flashing the medium to terminate the polymerization reaction), the product polymer can be recovered by processes well known in the art. Any excess reactants may be flashed off from the polymer.

The polymerization may be conducted employing liquid 1-butene as the reaction medium. Alternatively, polymerization may be accomplished in the presence of a hydrocarbon inert to the polymerization such as butane, isobutane, pentane, isopentane, hexane, isooctane, decane, toluene, xylene, and the like. The feedstream containing the 1-butene reactant may optionally contain certain amounts of other $C_4$ hydrocarbons. More particularly, the feedstream can comprise less than 5 wt. % isobutylene, at least 12 wt. % total n-butenes (i.e., 1-butene and 2-butene), and less than 1 wt. % butadiene, together with n-butane and isobutane. When used to prepare the EB copolymer, a preferred $C_4$ feedstream comprises spent $C_4$ streams produced as by-product in the manufacture of polyisobutylene, wherein the $C_4$ feedstream (often referred to as Raffinate II) contains less than 5 wt. % isobutylene, 10 to 70 wt. % saturated butanes and 15 to 85 wt. % 1-butene and 2-butene. The saturated butanes function as a diluent or solvent in the reaction mixture. Typically the $C_4$ feedstream is maintained at a sufficient pressure to be in the liquid form both at the reactor inlet and in the reaction mixture itself at the reaction temperature. The polymers are preferably formed in the substantial absence of added $H_2$ gas, that is, the absence of $H_2$ gas added in amounts effective to substantially reduce the polymer molecular weight. More preferably, the polymerizations will be conducted employing less than 5 wppm, and more preferably less than 1 wppm, of added $H_2$ gas, based on the moles of the ethylene monomer charged to the polymerization zone.

When carrying out the polymerization in a batch-type fashion, the reaction diluent (if any), ethylene and 1-butene comonomer are charged at appropriate ratios to a suitable reactor. Care must be taken that all ingredients are dry, with the reactants typically being passed through molecular sieves or other drying means prior to their introduction into the reactor. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As polymer is being formed, additional monomers may be added to the reactor. Upon completion of the reaction, unreacted monomer and solvent are either flashed or distilled off, if necessary by vacuum, and the low molecular weight copolymer withdrawn from the reactor.

The polymerization may be conducted in a continuous manner by simultaneously feeding the reaction diluent (if employed), monomers, catalyst and cocatalyst to a reactor and withdrawing solvent, unreacted monomer and polymer from the reactor so as to allow a residence time of ingredients long enough for forming polymer of the desired molecular weight and separating the polymer from the reaction mixture. The amount of trisubstituted olefinic unsaturation in the unsaturated polymer compositions of the invention varies according to polymerization conditions, catalyst type and amount, and monomer(s) used. Metallocene catalyst systems as described above are most useful to provide the trisubstituted unsaturation of the invention. Butene-1 and higher α-olefins are especially suitable monomers for providing a higher percentage of trisubstituted unsaturation, especially when used in high reactant amounts compared to other reactants. Ethylene and propylene are not preferred to provide trisubstituted unsaturation.

Use of propylene, e.g., as a comonomer with ethylene, minimizes one route for monomer insertion in chain growth which route at termination is available with butene-1 and higher α-olefins. For butene-1 and higher α-olefins, trisubstituted unsaturation chain termination is more prevalent, especially with the use of at least 15 mole % of such monomer(s) as the percentage of the monomer reactant composition. Temperature and pressure of the polymerization process may also be varied to promote trisubstituted and tetrasubstituted olefinic unsaturation in the product unsaturated polymer composition. The unsaturated polymer compositions of the invention are conveniently of a molecular weight range such that the amount and nature of the unsaturation are determinable by analytical techniques and substantial to a degree that they are both usable and affect the resultant compositions when used/mixed.

The oil soluble polymeric hydrocarbon backbone is conveniently an olefin polymer comprising a major molar amount (i.e. greater than 50 mole %) of a $C_2$ to $C_{10}$ olefin (e.g., ethylene, propylene, butylene, pentene-1, octene-1, styrene), and conveniently $C_2$ to $C_5$ olefin(s). The oil soluble polymeric hydrocarbon backbone may be a homopolymer or a copolymer of two or more of such olefins (e.g. copolymers of ethylene and an α-olefin such as propylene and butene-1). Other copolymers include those in which a minor molar amount of the copolymer monomers, e.g., 1 to 10 mole %, is a $C_3$ to $C_{22}$ non-conjugated diolefin (e.g., a copolymer of ethylene, propylene and 1,4-hexadiene).

The oil soluble polymeric hydrocarbon backbone will usually have $\overline{M}_n$ within the range of from 300 to 20,000. Where the primary function of the component is as a dispersant the $\overline{M}_n$ of the backbone is preferably within the range of 500 to 10,000, more preferably 700 to 5,000. Both relatively low molecular weight ($\overline{M}_n$ 500 to 1,500) and relatively high molecular weight ($\overline{M}n$ 1,500 to 5,000 or greater) are useful dispersants. Particularly useful olefin polymers for use in dispersants have $\overline{M}_n$ within the range of from 1,500 to 3,000. Where the component is also intended to have a viscosity modification effect it is desirable to use higher molecular weight, typically with $\overline{M}_n$ 20,000, and if the component is intended to function primarily as a viscosity modifier then the molecular weight may be even higher with an $\overline{M}_n$ of up to 500,000 or greater. The olefin polymers used primarily as dispersants preferably have approximately one terminal double bond per polymer chain.

The $\overline{M}_n$ for such polymers can be determined by several known techniques. A convenient method for such determination is by GPC which also provides molecular weight distribution information. One preferred class of olefin polymers is ethylene α-olefin copolymers or alpha-olefin homopolymers having in each case a high degree (e.g.>30%) of terminal unsaturation. Preferably, the polymers have at least 50% terminal unsaturation. Ethylene α-olefin copolymers of this type preferably contain 1 to 50 wt. % ethylene, and more preferably 5 to 45 wt. % ethylene. Such polymers may contain more than one α-olefin and may contain one or more $C_3$ to $C_{22}$ diolefins. Atactic propylene oligomer typically having $\overline{M}_n$ of from 700 to 500 may also be used, as described in EP-A0490454.

Employing a metallocene-alumoxane catalyst system in accordance with the procedures and under the conditions as described above can produce an ethylene-1-butene copolymer having an ethylvinylidene group terminating at least about 30% of all polymer chains. However, these procedures alone do not ensure that the resulting EB copolymer has the requisite $S_f$ value of about zero, the property which determines the polymer of this invention to be suitable for use as a backbone for lubricating oil dispersant additives. To produce the EB copolymers of the invention, the following catalysts, procedures and conditions are preferred. Illustrative of the most preferred catalysts are 1,1-dimethylsilyl-bridged bis(4,5,6,7-tetrahydroindenyl)zirconium dichloride and 1,1-dimethylsilyl-bridged bis(methylcyclopentadienyl)zirconium dichloride. The polymerization is preferably conducted using either liquid 1-butene or a mixture of liquid 1-butene in an inert hydrocarbon solvent or diluent at a temperature ranging from 50° to 200° C. and a pressure from 10 to 100 bar, preferably from 10 to 30 bar. When a solvent/diluent is employed, it is preferably a $C_4$ hydrocarbon (i.e., n-butane, isobutane, or mixtures thereof). The 1-butene feed may also contain the kinds and amounts of other $C_4$ hydrocarbons earlier discussed. The ethylene and 1-butene, whether as a liquid or mixed with a solvent/diluent, may be fed to the reactor as separate streams or as a single, pre-mixed stream. In either case, the ethylene content of the resulting polymer is controlled in part by the weight percent ethylene content, based upon the total weight of monomer, entering the reactor. The EB copolymer typically contains from 1 to 50 wt. % ethylene. The amount of ethylene incorporated into the EB copolymer depends upon the particular reaction conditions employed and the catalyst system selected. For a given set of conditions and a given catalyst system, the amount of ethylene required to provide an EB copolymer with a particular ethylene content can be readily determined by those skilled in the art without undue experimentation.

While conducting the polymerization, there is preferably sufficient mixing of the ethylene and 1-butene monomers in the reactor in order to avoid the production of ethylene homopolymer and to avoid the production of EB copolymers with $S_f$ values greater than zero. More particularly, it is preferred that ethylene monomer and 1-butene monomer together enter a turbulent zone inside the reactor. This can be accomplished in a stirred reactor, for example, by placing all of the monomer feed inlets near to each other and near the impeller blade. Mixing is also facilitated by the use of a dilute pre-mixed feed as described in U.S. Ser. No. 992690. Sufficient mixing in the reactor promotes the random incorporation of ethylene units in the growing polymer chains, resulting in EB copolymers of relatively homogeneous composition (both inter-chain and intra-chain) and relatively short sequences of ethylene (i.e., low ESL values), compared to analogous EB copolymers produced without such mixing. It is believed that the reason the EB polymers of the invention have $S_f$ values of zero is that the copolymer molecules contain relatively few crystalline-like, long ethylene sequences capable of acting as sites for aggregation. Sufficient mixing, thus, reduces the probability that sites for aggregation will form in the polymer molecules. Effective mixing is especially important to the production of EB copolymers of the invention having high ethylene content (i.e., above 35 wt. %), because, without such mixing, the resulting EB copolymers would tend to have sufficient ethylenic crystallinity in the copolymer molecules, as manifested by ESL values above 2.50, to exhibit $S_f$ values above zero. With a preferred catalyst employed in accordance with the procedures and conditions as just described an EB copolymer of the invention is produced; i.e., an EB copolymer which has an $S_f$ value of zero and an ethylvinylidene group terminating at least 30% of all polymer chains.

Thus, while the unsaturated polymer compositions of the invention may be of a broad range of molecular weights from about 300 $\overline{M}_n$ to 1,000,000 $\overline{M}_n$ or higher, preferred compositions are in the range of about 300 to 50,000, more preferably 300 to 20,000, e.g., 500–10,000 $\overline{M}_n$. When the unsaturated polymer compositions of the invention are to be used as a precursor to fuel or lubricating additives, about 300 to 10,000, preferably 500–7,000 $\overline{M}_n$ are derived for dispersant products; 10,000–50,000, preferably 20,000–40,000 $\overline{M}_n$ are desired for viscosity modifier products; and various other ranges are preferred for still other additives.

The unsaturated polymer compositions of the invention may be used as a mixture with certain basestocks because their trisubstituted and tetrasubstituted olefinic unsaturations are generally nonreactive in that environment compared to other unsaturation. Thus, they can, at an appropriate molecular weight, function as a part of, or extension of, the basestock. The compositions are also usable in a variety of reactions to open the double bonds of either the trisubstituted unsaturation, the other unsaturation, or both. The reaction to open the double bond of the trisubstituted (and tetrasubstituted) olefinic unsaturations must generally be of a stronger type than that required to react the other double bonds of the polymer chains. So long as appropriate strength reagents and conditions are chosen, addition reactions across double bonds may be carried out on the trisubstituted olefinic unsaturation of the unsaturated polymer compositions of the inventions. The reagents include HX compounds like HCl, HBr, or HF; acetic acid or sulfuric acid; RSH compounds such as ethane thiol and cyclohexanethiol; meta-chloro benzoic acid or peracetic acid (for epoxidation).

The unsaturated polymer compositions of the invention are also usable in various reactions to isomerize (or move)

the double bond of the trisubstituted olefinic unsaturation so long as reagents of an appropriate character/strength and appropriate conditions are used. The reagents include strong Lewis acids such as $AlCl_3$, sulfuric acid (and heat), and hydrogenation catalysts like palladium or platinum with hydrogen. Thus, various pericyclic reactions such as the "ene" reaction may be used to isomerize the double bond.

The oil soluble polymeric hydrocarbon backbone may be functionalized to incorporate a functional group into the backbone of the polymer, or as pendant groups from the polymer backbone. The functional group typically will be polar and contain one or more hetero atoms such as P, O, S, N, halogen, or boron. It can be attached to a saturated hydrocarbon part of the oil soluble polymeric hydrocarbon backbone via substitution reactions or to an olefinic portion via addition or cycloaddition reactions. Alternatively, the functional group can be incorporated into the polymer by oxidation or cleavage of a small portion of the end of the polymer (e.g., as in ozonolysis). Useful functionalization reactions include: halogenation of the polymer at an olefinic bond and subsequent reaction of the halogenated polymer with an ethylenically unsaturated functional compound; reaction of the polymer with an unsaturated functional compound by the "ene" reaction absent halogenation (an example of the former functionalization is maleation where the polymer is reacted with maleic acid or anhydride); reaction of the polymer with at least one phenol group (this permits derivatization in a Mannich Base-type condensation); reaction of the polymer at a point of unsaturation with carbon monoxide using a Koch-type reaction to introduce a carbonyl group in an iso or neo position; reaction of the polymer with the functionalizing compound by free radical addition using a free radical catalyst; reaction with a thiocarboxylic acid derivative; and reaction of the polymer by air oxidation methods, epoxidation, chloroamination, or ozonolysis.

The functionalized oil soluble polymeric hydrocarbon backbone is then further derivatized with a nucleophilic reactant such as an amine, amino-alcohol, alcohol, metal compound or mixture thereof to form a corresponding derivative. Reaction ratios of the functionalized oil soluble polymeric hydrocarbon to nucleophile can vary considerably, depending on the reactants and type of bonds formed. Examples of functionalized and/or derivatized olefin polymers derived from polymers made using metallocene catalyst systems are described in U.S. Pat. Nos. 5,017,299; 5,219,480; 5,229,022; U.S. Ser. Nos. 992,403; 992,690; 070,752; EP-A-440506; 513211; 513157. The functionalization and/or derivatizations and/or post treatments described in the following patents may also be adapted to functionalize and/or derivatize the preferred polymers described above: U.S. Pat. Nos. 3,275,554; 3,087,936 and 3,254,025.

The unsaturated polymer compositions of the invention, preferably, the terminally unsaturated 300–20,000 $\overline{M}_n$ compositions, also preferably with at least about 30% of the polymer chains having terminal unsaturation, may be functionalized by any means suitable for providing a "hook" or linking function such as by air oxidation, ozonization, Koch chemistry, acylation including succination, Mannich base techniques, polyanhydrides, acids, amidoamines, direct amination, etc. These products may then be derivatized to provide dispersants or viscosity modifiers. The ashless dispersants comprise an oil soluble polymeric hydrocarbon backbone having functional groups that are capable of associating with particles to be dispersed. Typically, the dispersants comprise amine alcohol, amide, or ester polar moieties associated with the polymer backbone by a bridging group. The ashless dispersant may be, for example, selected from oil soluble salts, esters, amides, imides, and oxazolines of long chain hydrocarbon substituted mono and dicarboxylic acids or their anhydrides; thiocarboxylate derivatives of long chain hydrocarbons; long chain aliphatic hydrocarbons having a polyamine attached directly thereto; and Mannich condensation products formed by condensing a long chain substituted phenol with formaldehyde and polyalkylene polyamine.

The polymers produced in accordance with the present invention can be functionalized, i.e., chemically modified, to have at least one functional group present within its structure, which functional group is capable of: (1) undergoing further chemical reaction (e.g. derivatization) with other material/and or (b) imparting desirable properties, not otherwise possessed by the polymer alone, absent such chemical modification. The functional group can be incorporated into the backbone of the polymer, or can be attached as a pendant group from the polymer backbone. The functional group typically will be polar and contain hetero atoms such as P, O, S, N, halogen and/or boron. It can be attached to the saturated hydrocarbon part of the polymer via substitution reactions or to an olefinic portion via addition or cycloaddition reactions. Alternatively, the functional group can be incorporated into the polymer by oxidation or cleavage of a small portion of the end of the polymer (e.g. as in ozonolysis). Functionalization of the polymer backbone with substituent functional groups typically relies on an ethylenic unsaturation, preferably a terminal ethylenic unsaturation, present in the polymer for reaction with a functional compound containing or constituting the functional group. Thus, reaction of these functional compounds and the polymer can occur through a variety of mechanisms. Useful and preferred functional groups include halogen, carboxyl materials present as acids, esters, salts, or anhydrides, alcohols, amines, ketones, aldehydes and the like.

Useful functionalization reactions include: maleation, which is the reaction of the polymer at the point of unsaturation with maleic acid or anhydride (an example of acyl functionalization); halogenation of the polymer at the olefinic bond and subsequent reaction of the halogenated polymer with an ethylenically unsaturated functional compound; reaction of the polymer with an unsaturated functional compound by the "ene" reaction absent halogenation; reaction of the polymer with at least one phenol group; (this permits derivatization in a Mannich Base-type condensation); reaction of the polymer at its point of unsaturation with carbon monoxide using a Koch-type reaction wherein an acid group such as an iso acid or neo acid is formed; reaction of the polymer with the functional compound by free radical addition using a free radical catalyst; and reaction of the polymer by air oxidation methods, epoxidation, chloroamination or ozonolysis. Most of these functionalization reactions is well known to those skilled in the art. Characterization of the degree to which the polymer has been functionalized is referred to herein as "functionality". Functionality refers generally to the average number of functional groups present within the polymer structure per polymer chain. Thus, functionality can be expressed as the average number of moles of functional groups per "mole of polymer".

The particular functionality selected, for polymer intended to be derivatized, will depend on the nature of the derivatization reactions and type and number of chemical linkages established by the derivatizing compound. In most instances, one derivatizing linkage will be formed for each functional group, e.g., each carboxy functional group will form 1 ester linkage. However, certain functional groups are capable of not only acting individually to form a single derivatizing linkage, but also collectively such that two functional groups form a single derivatizing linkage. For example, where two carboxy groups form an anhydride group and the derivatizing group is a primary amine it is possible to form, inter-alia, two amide linkages or one imide linkage. Thus, while the anhydride group contains two carboxy functional groups, the chemical effect obtainable therefrom when both functional groups react, depends on the number of derivatizing linkages achieved. Accordingly, for purposes of the present invention, when functionality is reported in the context of describing functionalized polymer intended for derivatization, and the subject functional groups are capable of forming less than one derivatizing linkage per functional group, such functionality is to be interpreted as representing the average number of derivatizing linkages to be produced per polymer chain.

As indicated above, a functionalized polymer is one which is chemically modified primarily to enhance its ability to participate in a wider variety of chemical reactions than would otherwise be possible with the unfunctionalized polymer. In contrast, a derivatized polymer is one which has been chemically modified to perform one or more functions in a significantly improved way relative to the unfunctionalized polymer and/or the functionalized polymer. Representative of such functions, are dispersancy and/or viscosity modification in lubricating oil compositions. Typically, derivatization is achieved by chemical modification of the functionalized polymer by reaction with at least one derivatizing compound to form derivatized polymers. The derivatizing compound typically contains at least one reactive derivatizing group capable of reacting with the functional groups of the functionalized polymers, for example, by nucleophilic substitution, Mannich Base condensation, transesterification, salt formations, and the like. The derivatizing compound preferably also contains at least one additional group suitable for imparting the desired properties to the derivatized polymer, e.g., polar groups. Thus, such derivatizing compounds typically will contain one or more groups including amine, hydroxy, ester, amide, imide, thio, thioamido, oxazoline or salt groups derived from reactive metal or reactive metal compounds. Thus, the derivatized polymers can include the reaction product of the above recited functionalized polymer with a nucleophilic reactant, which includes, amines, alcohols, amino-alcohols and mixtures thereof, to form oil soluble salts, amides, imides, oxazoline, reactive metal compounds and esters of mono- and dicarboxylic acids, esters or anhydrides. Suitable properties sought to be imparted to the derivatized polymer include especially dispersancy, but also multifunctional viscosity modification, antioxidancy, friction modification, antiwear, antirust, seal swell, and the like.

Ash-producing detergents can be made using the functionalized polymers of the present invention as exemplified by oil-soluble neutral and basic salts of alkali or alkaline earth metals with alkyl phenols, alkyl sulfonic acids, carboxylic acids, or organic phosphorus acids characterized by at least one direct carbon-to-phosphorus linkage such as those prepared from the functionalized olefin polymer of the present invention.

The derivatized polymer compositions of the present invention, can be used as ashless dispersants in lubricant and fuel compositions. Ashless dispersants are referred to as being ashless despite the fact that, depending on their constitution, the dispersants may, upon combustion, yield a non-volatile material such as boric oxide or phosphorus pentoxide. The compounds useful as ashless dispersants generally are characterized by a "polar" group attached to a relatively high molecular weight hydrocarbon chain supplied by the polymer of the present invention. The "polar" group generally contains one or more of the elements nitrogen, oxygen and phosphorus. The solubilizing chains are generally higher in molecular weight than those employed with the metallic based dispersants, but in some instances they may be quite similar. Various types of ashless dispersants can be made by derivatizing the polymer of the present invention and are suitable for use in the lubricant compositions. The following are illustrative:

1. Reaction products of functionalized polymer of the present invention derivatized with nucleophilic reagents such as amine compounds, e.g. nitrogen-containing compounds, organic hydroxy compounds such as phenols and alcohols, and/or basic inorganic materials. More specifically, nitrogen- or ester-containing ashless dispersants comprise members selected from the group consisting of oil-soluble salts, amides, imides, oxazolines and esters, or mixtures thereof, of the polymer of the present invention, functionalized with mono- and dicarboxylic acids or anhydride or ester derivatives thereof, said polymer having dispersant range molecular weights as defined hereinabove. At least one functionalized polymer is mixed with at least one of amine, alcohol, including polyol, aminoalcohol, etc., to form the dispersant additives. One class of particularly preferred dispersants includes those derived from the polymer of the present invention functionalized mono- or dicarboxylic acid material, e.g. succinic anhydride, and reacted with (i) a hydroxy compound, e.g. pentaerythritol, (ii) a polyoxyalkylene polyamine, e.g. polyoxypropylene diamine, and/or (iii) a polyalkylene polyamine, e.g., polyethylene diamine or tetraethylene pentamine referred to herein as TEPA. Another preferred dispersant class includes those derived from functionalized polymer reacted with (i) a polyalkylene polyamine, e.g. tetraethylene pentamine, and/or (ii) a polyhydric alcohol or polyhydroxy-substituted aliphatic primary amine, e.g., pentaerythritol or trismethylolaminomethane.

2. Reaction products of the polymer of the present invention functionalized with an aromatic hydroxy group and derivatized with aldehydes (especially formaldehyde) and amines (especially polyalkylene polyamines), through the Mannich reaction, which may be characterized as "Mannich dispersants".

3. Reaction products of the polymer of the present invention which have been functionalized by reaction with halogen and then derivatized by reaction with amines (e.g. direct amination), preferably polyalkylene polyamines. These may be characterized as "amine dispersants" and examples thereof are described, for example, in U.S. Pat. Nos. 3,275,554; 3,822,209 and 5,084,197.

Useful amine compounds for derivatizing functionalized polymers comprise at least one amine and can comprise one or more additional amines or other reactive or polar groups. Where the functional group is a carboxylic acid, ester or derivative thereof, it reacts with the amine to form an amide. Where the functional group is an epoxy it reacts with the amine to form an amino alcohol. Where the functional group is a halide the amine reacts to displace the halide. Where the functional group is a carbonyl group it reacts with the amine to form an imine. Preferred amine compounds include mono- and (preferably) polyamines, of 2 to 60, preferably 2 to 40 (e.g. 3 to 20), total carbon atoms of 1 to 12, preferably 3 to 12, and most preferably 3 to 9 nitrogen atoms in the molecule. These amines may be hydrocarbyl amines or may be hydrocarbyl amines including other groups, e.g., hydroxy groups, alkoxy groups, amide groups, nitriles, imidazoline groups, and the like. Hydroxy amines with 1 to 6 hydroxy groups, preferably 1 to 3 hydroxy groups, are particularly useful. Preferred amines are aliphatic saturated amines.

The functionalized polymers, particularly acid functionalized polymers, of the present invention can be reacted with alcohols, e.g. to form esters. The alcohols may be aliphatic compounds such as monohydric and polyhydric alcohols or aromatic compounds such as phenols and naphthols. The esters may be prepared, for example, by reacting a suitable alcohol or phenol with the acid or anhydride (i.e., functionalized polymer succinic anhydride). Ester derivatives likewise may be obtained by the reaction of a acid functionalized polymer with epoxide or a mixture of an epoxide and water. Procedures are well known for reacting high molecular weight carboxylic acids with alcohols to produce acidic esters and neutral esters. These same techniques are applicable to preparing esters from the functionalized polymer of this invention and the alcohols described above. All that is required is that the functionalized polymers of this invention be substituted for the high molecular weight carboxylic acids discussed in these patents, usually on an equivalent weight basis.

The hydroxy aromatic functionalized polymer aldehyde/ amino condensates useful as ashless dispersants in the compositions of this invention include those generally referred to as Mannich condensates. Generally they are made by reacting simultaneously or sequentially at least one active hydrogen compound such as a hydrocarbon-substituted phenol (e.g., hydroxy aromatic functionalized polymer of the present invention), having at least one hydrogen atom bonded to an aromatic carbon, with at least one aldehyde or aldehyde-producing material (typically formaldehyde precursor) and at least one amino or polyamino compound having at least one NH group. Preferred phenolic compounds include the hydroxy aromatic functionalized polymer and useful amine compounds are well known. The amine compounds include primary or secondary monoamines having hydrocarbon substituents of 1 to 30 carbon atoms or hydroxyl-substituted hydrocarbon substituents of 1 to about 30 carbon atoms. Another type of typical amine compound are the polyamines.

A useful group of Mannich Base ashless dispersants are those formed by condensing phenol functionalized polymer with formaldehyde and polyethylene amines, e.g., tetraethylene pentamine, pentaethylene hexamine, polyoxyethylene and polyoxypropylene amines, e.g., polyoxypropylene diamine and combinations thereof.

A useful class of nitrogen-containing condensation products for use in the present invention are those made by a "2-step process" as disclosed in U.S. Pat. No. A 4273891. Briefly, these nitrogen-containing condensates are made by (1) reacting at least phenol functionalized polymer of the present invention with a lower aliphatic $C_1$ to $C_7$ aldehyde or reversible polymer thereof in the presence of an alkaline reagent, such as an alkali metal hydroxide, at a temperature up to about 150° C.; (2) substantially neutralizing the intermediate reaction mixture thus formed; and (3) reacting the neutralized intermediate with at least one compound which contains an amino group having at least one —NH— group. These 2-step condensates can be made from (a) phenol functionalized polymer and (b) formaldehyde, or reversible polymer thereof, (e.g., trioxane, paraformaldehyde) or functional equivalent thereof, (e.g., methylol) and (c) an alkylene polyamine such as ethylene polyamines having between 2 and 10 nitrogen atoms.

Useful reactive metals or reactive metal compounds are those which will form metal salts or metal-containing complexes with the functionalized polymer. Metal complexes are typically achieved by reacting the functionalized polymers with amines and/or alcohols as discussed above and also with complex forming reactants either during or subsequent to amination. Reactive metal compounds for use in the formation of complexes with the reaction products of functionalized polymer and amines include those disclosed in U.S. Pat. No. A-3306908. Complex-forming metal reactants include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt, nickel, copper and zinc). These metals are the so-called transition or coordination metals, i.e., they are capable of forming complexes by means of their secondary or coordination valence.

The polymer of this invention may be used as a synthetic base oil. The functionalized polymer, in addition to acting as intermediates for dispersant manufacture, can be used as a molding release agent, molding agent, metal working lubricant, paint thickener and the like. The primary utility for the above-described materials, from polymer all the way through and including post-treated derivatized polymer, is as an additive for oleaginous compositions. For ease of discussion, the above-mentioned materials are collectively and individually referred to herein as additives when used in the context of an oleaginous composition containing such "additives". Accordingly, the additives of the present invention may be used by incorporation and dissolution into an oleaginous material such as fuels and lubricating oils. When the additives of this invention are used in normally liquid petroleum fuels such as middle distillates boiling from 65° C. to 430° C., including kerosene, diesel fuels, home heating fuel oil, jet fuels, etc., there is typically used a concentration of the additives in the fuel in the range of from 0.001 to 0.5, and preferably 0.005 to 0.15 wt. %, based on the total weight of the composition.

The additives of the present invention are primarily useful in lubricating oil compositions which employ a base oil in which the additives are dissolved or dispersed therein. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

The additives of the present invention, particularly those adapted for use as dispersants, can be incorporated into a lubricating oil in any convenient way. Thus, they can be added directly to the oil by dispersing or dissolving the same in the oil at the desired level or concentration of the additive, at room temperature or elevated temperatures. Alternatively, the additives can be blended with a suitable oil-soluble solvent and base oil to form a concentrate, and then blending the concentrate with a lubricating oil basestock to obtain the final formulation. Such dispersant concentrates will typically contain (on an active ingredient (AI) basis) from 10 to 80 wt. %, typically 20 to 60 wt. %, and preferably from 40 to 50 wt. %, additive, and typically from 40 to 80 wt. %, preferably from 40 to 60 wt. %, base oil, i.e., hydrocarbon oil based on the concentrate weight. The lubricating oil basestock for the additive typically is adapted to perform a selected function by the incorporation of additional additives therein to form lubricating oil compositions (i.e., formulations). Usually concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, the additives of the present invention and formulations containing them would usually be employed in the form of a 40 to 50 wt. % concentrate, for example, in a lubricating oil fraction. The additives of the present invention will be generally used in admixture with a lube oil basestock, comprising an oil of lubricating viscosity, including natural and synthetic lubricating oils and mixtures thereof. Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins. Alkylene oxide polymers and interpolymers and derivatives thereof where the terminal hydroxyl groups have been modified by esterification, etherification, etc., constitute another class of known synthetic lubricating oils. Other suitable classes of synthetic lubricating oils comprise the esters of dicarboxylic acids and silicon and silicate based oils. Additionally, unrefined, refined and rerefined oils can be used in the lubricants of the present invention.

Lubricating oil formulations containing the additives of the present invention conventionally contain other types of additives that contribute other characteristics that are required in the formulation. Typical of such other additives are detergent/inhibitors, viscosity modifiers, wear inhibitors, oxidation inhibitors, corrosion inhibitors, friction modifiers, foam inhibitors, rust inhibitors, demulsifiers, lube oil flow improvers, and seal swell control agents, etc. Some of the additives can provide multiple effects e.g., a dispersant oxidation inhibitor. Compositions, when containing these additives, typically are blended into the base oil in amounts which are effective to provide their normal attendant function. Representative effective amounts of such additives are illustrated as follows:

| Compositions | Range | |
|---|---|---|
| | Broad Wt. % | Preferred Wt. % |
| Viscosity Index Improver | 1–12 | 1–4 |
| Corrosion Inhibitor | 0.01–3 | 0.01–1.5 |
| Oxidation Inhibitor | 0.01–5 | 0.01–1.5 |
| Dispersant | 0.1–10 | 0.1–5 |
| Lube Oil Flow Improver | 0.01–2 | 0.01–1.5 |
| Detergents and Rust Inhibitors | 0.01–6 | 0.01–3 |
| Pour Point Depressant | 0.01–1.5 | 0.01–1.5 |
| Anti-Foaming Agents | 0.001–0.1 | 0.001–0.01 |
| Antiwear Agents | 0.001–5 | 0.001–1.5 |
| Seal Swellant | 0.1–8 | 0.1–4 |
| Friction Modifiers | 0.01–3 | 0.01–1.5 |
| Lubricating Base Oil | Balance | Balance |

When other additives are employed, it may be desirable, although not necessary, to prepare additive concentrates comprising concentrated solutions or dispersions of the subject additives of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the subject additives of the present invention can be added to small amounts of base oil or other compatible solvents along with other desirable additives to form additive-packages containing active ingredients in collective amounts of typically from 2.5 to 90%, and preferably from 15 to 75%, and most preferably from 25 to 60% by weight additives in the appropriate proportions with the remainder being base oil. The final formulations may employ typically 10 wt. % of the additive-package with the remainder being base oil. (All weight percents expressed herein, unless otherwise indicated, are based on active ingredient (AI) content of the additive, and/or upon the total weight of any additive-package, or formulation which will be the sum of the AI weight of each additive plus the weight of total oil or diluent).

EXAMPLE 1

In a continuous polymerization, ethylene gas was continuously injected into a liquid stream composed of 40 wt. % 1-butene and 60 wt. % isobutane at a rate sufficient to provide 8.5 wt. % ethylene content, based upon the total weight of monomer. The reactant stream containing ethylene, 1-butene, and isobutane was continuously fed into a 568-liter, stirred boiling reactor equipped with a water jacket for temperature control at a rate of about 370 kg per hour, wherein the vapor formed in the reactor is condensed in an overhead reflux condenser and returned to the reactor. A catalyst solution was prepared by dissolution of solid 1,1-dimethylsilyl-bridged bis(4,5,6,7-tetrahydroindenyl)zirconium dichloride into a 10 wt. % solution of methylalumoxane in toluene, such that the Al:Zr molar ratio in the solution was 500:1. The catalyst solution was continuously pumped into the boiling reactor at a rate sufficient to provide a molar Zr concentration of $0.25 \times 10^{-5}$. The temperature of the reactor was maintained at 160° F., and the reactor pressure was maintained at 170–175 psig (ca. 13 bar). The reactor contents were continuously stirred at a rate of 300 rpm. The reactor residence time was 1 hour. The product stream was continuously fed from the boiling reactor to a quench drum, where it was contacted with an aqueous solution of 350 ppm $NH_4OH$. The unreacted monomer, solvent, and quench water were removed from the product by nitrogen stripping.

The polymer product was then filtered to remove the catalyst residue.

The yield of ethylene-1-butene copolymer was about 70 kg per hour. The ethylene content of the copolymer was 22.8 wt. %, as determined by proton NMR. According to an analysis by proton NMR, 69.6% of the polymer chains in the polymer were found to have terminal ethylvinylidene unsaturation, and 0% were found to have terminal vinyl unsaturation. The polymer had a M n of 4,666 and MWD of 2.3, as determined by gel permeation chromatography using a calibration curve for a polydisperse EB copolymer with 20 wt. % ethylene content.

EXAMPLE 2

The polymerization was performed as in Example 1, except that the reactor temperature and pressure were 175° F. and 225 psig (ca. 16.5 bar) respectively. In addition, the reactant stream consisted of a liquid stream composed of 38.5 wt. % 1-butene and 61.5 wt. % isobutane into which ethylene gas was injected at a rate sufficient to provide 19 wt. % ethylene content, based upon the total weight of monomer. The reactant stream was fed into the reactor at a rate of 403 kg per hour. The yield of ethylene-1-butene copolymer was 98 kg per hour. The polymer had 38.9 wt. % ethylene content, 66.3% terminal ethylvinylidene unsaturation, and 0% terminal vinyl unsaturation. The $\overline{M}_n$ and MWD of the polymer were 4,325 and MWD of 2.34 respectively, as determined by GPC using the calibration curve for a polydisperse EB copolymer of 40 wt. % ethylene content.

EXAMPLE 3

In a continuous polymerization, ethylene gas was continuously injected into a liquid stream composed of 55.7 wt. % 1-butene and 44.3 wt. % n-butane at a rate sufficient to provide 12.9 wt. % ethylene content, based upon the total weight of monomer. The reactant stream containing ethylene, 1-butene, and n-butane was continuously fed at a temperature of about 75° C. into the bottom of a stirred 1500 ml Monel autoclave reactor at a rate of about 1.92 kg per hour. A catalyst stock solution was prepared by dissolution of solid 1,1-dimethylsilyl-bridged bis(4,5,6,7-tetrahydroindenyl)zirconium dichloride in toluene, followed by addition of the dissolved catalyst to a 10 wt. % solution of methylalumoxane in toluene, such that the Al:Zr molar ratio in the stock solution was 1000:1. The stock catalyst solution was continuously pumped into the reactor at a rate sufficient to provide a molar Zr concentration of $0.36 \times 10^{-5}$. The reactor contents were continuously stirred at a rate of 1500 rpm. The temperature and pressure of the reactor were respectively maintained at 90° C. and about 260 psig (ca. 19 bar). The reactor residence time was 30 min. The product stream was continuously removed from the top of the reactor, quenched by contact with a 10 wt. % caustic solution, and then scrubbed by contact with water to remove traces of the caustic. Both the quenching step and the scrubbing step also served to remove some of the ash. Unreacted monomer, solvent, and water were then removed from the product polymer by flashing. The yield of ethylene-1-butene copolymer was about 0.70 kg per hour. As determined by proton NMR, the ethylene content was 16.9 wt. %, and 63% and 0% of the polymer chains in the polymer were respectively found to have terminal ethylvinylidene and terminal vinyl unsaturation. The polymer had a $\overline{M}_n$ of 2,797 and MWD of 2.15, as determined by gel permeation chromatography using a polydisperse EB copolymer with 20 wt. % ethylene as the calibration standard.

EXAMPLE 3A

The polymerization was performed as in Example 1, except that the reactor temperature and pressure were 205° F. and 320 psig (ca. 23 bar) respectively. In addition, the reactant stream consisted of a liquid stream composed of 40 wt. % 1-butene and 60 wt. % isobutane into which ethylene gas was injected at a rate sufficient to provide 27 wt. % ethylene content, based upon the total weight of monomer. The reactant stream was fed into the reactor at a rate of 422 kg per hour. The yield of ethylene-1-butene copolymer was 106 kg per hour. The polymer had a $\overline{M}_n$ of 8,027, MWD of 2.74, 55.1 wt. % ethylene content, 50.3% terminal ethylvinylidene unsaturation, and 4.3% terminal vinyl unsaturation.

EXAMPLE 3B

In a continuous polymerization, separate streams of fresh ethylene gas and fresh 1-butene gas flowing at the respective rates of 4.3 and 8 kg per hour were continuously mixed together, and the mixture compressed to 1550 bar and chilled to 30° C. The chilled mixture of ethylene and 1-butene gas was then fed to the top of a 3000 ml, jacketed, staged, steel autoclave reactor. A catalyst stock solution was prepared by dissolution of solid bis-(methylcylopentadienyl)zirconium dichloride into a 10 wt. % solution of methylalumoxane in toluene, such that the final Al:Zr molar ratio in the stock solution was 250:1. The catalyst stock solution was continuously pumped into the reactor at a rate of 650 ml per hour. The reactor contents were continuously stirred with an agitator operating at 1900 rpm. The temperature and pressure in the reactor were respectively maintained at 125° C. and about 1330 bar. The reactor residence time was about 1 minute. The product stream exiting the bottom of the reactor was a mixture of polymer product, unreacted monomer, and catalyst fragments and by-products. After deactivation of the catalyst, unreacted monomer was separated from the polymer product in a high-pressure separator operated at 195° C. and a reduced pressure of 63 bar, and the unreacted monomer was recycled back to the reactor. The polymer product was then transferred to a low pressure separator, operated at 1.1 bar and 180° C., for further separation and removal of residual unreacted monomer in the product stream. The yield of ethylene-1-butene copolymer was about 6 kg per hour. As determined by proton NMR, the ethylene content was 55 wt. %, and 68% of the polymer chains in the polymer were found to have terminal ethylvinylidene unsaturation. The polymer had a $\overline{M}_n$ of 2,000 and MWD of 3.6, as determined by gel permeation chromatography, using a polydisperse EB copolymer with 60 wt. % ethylene content as the calibration standard.

POLYMER PROPERTIES

Properties of each of the EB copolymers prepared in Examples 1–3B were measured in accordance with the following procedures. As an additional comparison, certain of the properties were also determined by these procedures for an isotactic poly(1-butene) with $\overline{M}_n$ of 1165 (hereinafter Example 3C):

Scattering Factor $S_f$ by Light Scattering 0.5g of the EB copolymer was added to 9.5 g of S150NL mineral oil (5 wt. % EB copolymer solution), mixed for approximately 16 hrs. at room temperature, heated and occasionally shaken in an oven at 80°–85° C. for several hours, and then filtered at 80°–85° C. About a 5 ml portion of the hot, filtered solution was then immediately quenched by placing it in the sample chamber of a Brookhaven light scattering goniometer which contains an index matching bath at a temperature of 20° C. Light from a Spectra-Physics model 124B He—Ne laser (wavelength=632.8 nm) was directed onto the sample, and the scattered light intensity at a forward scattering angle of 45° was recorded in units of photon counts per second using a Brookhaven BI2000 correlator, where the intensity level was recorded every ten seconds for 60 min. following the quench. The results of these procedures for each of the Examples are collected together in Table 1 following. In addition, FIG. 3-A presents a plot of the scattered light intensity as a function of the time following the quench for the EB copolymer product prepared in Example 1. As shown in FIG. 3-A, average scattered intensity did not change as a function of time after the quench for the duration of the test. $S_f$ was, therefore, zero. FIG. 3-B shows a plot of the scattered light intensity as a function of the time following the quench for the solution prepared from Example 3B. As shown in FIG. 3-B, $I_o$ and $I_{eq}$ were respectively 700 and 7000 counts per second, resulting in an $S_f$ value greater than zero.

TABLE I

| Example | $I_O$ (photon counts/sec) | $I_{eq.}$ (photon counts/sec) | $S_f$ |
|---|---|---|---|
| 1 | 300 | 300 | 0 |
| 2 | 300 | 300 | 0 |
| 3 | 700 | 700 | 0 |
| 3A | 300 | 480 | 0.6 |
| 3B | 700 | 7000 | 9 |
| 3C | 300 | 300 | 0 |

Ethylene Sequence Length (ESL) by C—13 NMR 1 g of the EB copolymer product was dissolved in 4 g of $CDCl_3$, which also contained 40 mg of chromium acetylacetonate as a paramagnetic relaxation agent. The solution so prepared was then used as a sample for measuring the C—13 NMR spectrum. The C—13 NMR spectrum was recorded on a JEOL GSX400 NMR spectrometer at 100 MHz. The following instrument conditions were employed: sample temperature, 30° C.; pulse flip angle, 90°; pulse repetition delay, 3 seconds; number of acquisitions per spectrum, 8,000; and sweep width, 40,000 Hz. Proton decoupling was employed during acquisition, but not during recycle delay. Based upon an analysis of the spectrum that included the contributions of the terminal groups in the polymer chains, the triad concentrations $X_{EEE}$, $X_{BEE+EEB}$, and $X_{BEB}$ were obtained, and ESL was calculated. The results of these procedures are given in Table II.

TABLE II

| Example | $X_{EEE}$ | $X_{BEE+EEB}$ | $X_{BEB}$ | ESL |
|---|---|---|---|---|
| 1 | 0.051 | 0.138 | 0.148 | 1.55 |
| 2 | 0.164 | 0.268 | 0.123 | 2.16 |
| 3 | 0.052 | 0.144 | 0.160 | 1.54 |
| 3A | 0.342 | 0.300 | 0.070 | 3.24 |
| 3B | 0.298 | 0.312 | 0.091 | 2.84 |

Pour Point

A blend was prepared containing 2 wt. % of EB copolymer product, 0.2 wt. % of a dialkyl fumarate-vinyl acetate copolymer lube oil flow improver sold commercially by Exxon Chemical Company, and a balance of S150NL mineral oil. The pour point of the blend was then measured according to ASTM Method No. D97. Table III presents the results of the pour point measurements for each of Examples 1–3. The pour points of twenty additional EB copolymer products, prepared in accordance with the general methods described earlier in the specification ("Preparation of the Ethylene-1-Butene Copolymer") were measured via the procedure described above. Table IV summarizes the results, along with wt. % ethylene and $\overline{M}_n$. The pour points for these polymers are reported in order of increasing ethylene content as sample numbers 1–3, 5–9, 11–18, 20, and 22–24. Table IV also includes, for comparative purposes, the same data for the EB copolymers of Examples 1 and 2, corresponding respectively to sample nos. 4 and 10, and Examples 3A and 3B, corresponding respectively to sample nos. 21 and 19. FIG. 2 provides a graphical representation of the data in Table IV. FIG. 2 plots pour point as a function of ethylene content, wherein the pour point of each copolymer in the plot is marked by a circle whose diameter is proportional to the $\overline{M}_n$ of the copolymer. The number associated with each circle is the sample number of the copolymer in Table IV.

Summary of Properties

Table III below summarizes some of the key property values determined as described above for Examples 1–3C including ethylene content (wt. %) $\overline{M}_n$, ESL, $S_f$, and pour point.

TABLE III

| EB Polymer of Example | Ethylene Content (wt. %) | $\overline{M}_n$ | ESL | $S_f$ | Pour Point (°C.)* |
|---|---|---|---|---|---|
| 1 | 22.8 | 4666 | 1.55 | 0 | −30 |
| 2 | 38.9 | 4325 | 2.16 | 0 | −36 |
| 3 | 16.9 | 2797 | 1.54 | 0 | −30 |
| 3A | 55.1 | 8027 | 3.24 | 0.6 | −18 |
| 3B | 55 | 2000 | 2.84 | 9 | −33 |
| 3C | 0 | 1165 | — | 0 | −27 |

*The respective pour points of S150NL mineral oil neat and a blend of S150NL with 0.2 wt. % of lubricant improver were −18° C. and −30° C., determined by ASTM Method No. D97.

As shown in Table III, the polymers of Examples 1–3 all have $S_f$ values of zero (i.e., an absence of aggregation), satisfactory pour points of −30° C. or less, and ESL values <2.50. These data describe EB copolymers which, under the conditions specified in the Examples supra, have insufficient ethylenic crystallinity to act as sites for either copolymer aggregation in a quenched mineral oil solution or to adversely affect the pour point of the oil by participation in the crystalline wax network that forms as the mineral oil is cooled. At the opposite extreme is Example 3A, which has $S_f$ greater than zero, an unsatisfactory pour point of −18° C., and a relatively high ESL value of 3.24. These data describe an EB copolymer which has substantial ethylenic crystallinity, such that the copolymer both aggregates after solution quenching and adversely affects pour point by contributing to the formation of the wax crystal network in the cooling oil. Occupying an intermediate position is Example 3B, which has $S_f$ greater than zero, a satisfactory pour point of −33° C., and an intermediate ESL value of 2.84. These data characterize an EB copolymer with sufficient ethylenic crystallinity to aggregate after quenching, but which is insufficient to contribute to the wax crystalline network in a manner which adversely affects pour point. The data in Table III further demonstrates that the isotactic poly(1-butene) of Example 3C has a tendency not to aggregate, (i.e., $S_f$ of zero) and has a relatively minor effect on pour point. This indicates that, relative to ethylenic crystallinity, isotactic crystallinity due to relatively long 1-butene sequences in EB copolymer chains plays little or no role in copolymer aggregation or pour point behavior.

TABLE IV

| Sample No. | $M_n$ | Ethylene Content (wt. %) | Pour Point (°C.) |
| --- | --- | --- | --- |
| 1 | 1,627 | 15 | −36 |
| 2 | 2,797 | 17 | −36 |
| 3 | 1,962 | 22 | −33 |
| 4 | 4,666 | 22.8 | −30 |
| 5 | 2,595 | 27 | −33 |
| 6 | 1,932 | 28 | −33 |
| 7 | 3,731 | 33 | −33 |
| 8 | 2,742 | 35 | −36 |
| 9 | 3,049 | 36 | −33 |
| 10 | 4,325 | 38.9 | −36 |
| 11 | 3,571 | 40 | −36 |
| 12 | 6,655 | 41 | −33 |
| 13 | 7,204 | 41 | −36 |
| 14 | 6,192 | 45 | −36 |
| 15 | 3,370 | 50 | −18 |
| 16 | 2,844 | 51 | −36 |
| 17 | 10,254 | 51 | −18 |
| 18 | 4,353 | 53 | −24 |
| 19 | 2,000 | 55 | −33 |
| 20 | 11,869 | 55 | −18 |
| 21 | 8.027 | 55.1 | −18 |
| 22 | 12,432 | 61 | −18 |
| 23 | 3,153 | 61 | −18 |
| 24 | 3,062 | 62 | −21 |

EXAMPLES 4–6

In separate runs, each of the EB copolymers prepared in Examples 1–3 and pulverized maleic anhydride is charged at a ratio of 1.6 moles of maleic anhydride to one mole of EB copolymer under dry nitrogen and at atmospheric pressure to a 100 ml pressure reactor equipped with a stirrer and a thermocouple and heated by means of an electric heating mantle. The reaction mixture is heated to 70° C., after which the reactor is gently purged by bubbling dry nitrogen through the liquid reaction mixture for 15 min. The purging is then terminated and the reactor sealed. The reactor temperature is then raised to a temperature of 220° C. and is maintained at that temperature for 6 hrs. while stirring. The reaction is then terminated by cooling the reaction mixture to about 60° C., after which the liquid mixture is transferred to a glass beaker. Unreacted maleic anhydride is stripped off by passing dry nitrogen gas through the liquid at 140° C. The liquid product so prepared in each run is expected to contain EBSA and unreacted EB copolymer and to have little or no observable sediment. The product is also expected to have an AI value (active ingredient weight fraction equal to the weight fraction of functionalized polymer divided by the total weight of functionalized and unfunctionalized polymer) of at least about 65 to 75, a value of F (average number of moles of functional groups per mole of total polymer) between about 1.10 and 1.25.

EXAMPLES 5–7

In separate runs, dispersant materials are prepared utilizing liquid EBSA products as prepared in Examples 4–6. The succinic acid anhydride substituted polymers are dissolved in an equal amount by weight of S150NL mineral oil. To the polymer solution is added tetraethylene pentamine (TEPA), and the mixture is heated to 140° C. under nitrogen while stirring for about 2 to 4 hrs. The molar ratio of total polymer to polyamine in terms of succinic acid equivalents to TEPA charged is 2 to 1.

EXAMPLE 8

About 50 grams of the EB copolymer prepared in Example 1 is dissolved in 100 ml of chlorobenzene and added to a solution containing about 10 gram of phenol in 300 ml of chlorobenzene. While stirring at room temperature under nitrogen, 0.5 g of $BF_3$ gas is bubbled into the charged solution, and the reaction mixture is stirred while the temperature is increased to 50° C. for about one hour. The reaction mixture is then neutralized with gaseous ammonia until a neutral pH is obtained. The solution is filtered and the filtrate is heated to 150° C. to distill off the solvent and excess phenol. About 90% or more of the EB copolymer is expected to alkylate with the phenol to form EB copolymer substituted phenol.

To a 500 ml round-bottomed reaction flask is charged 25 grams of S150NL lubricating oil in which is dissolved 25 grams of EB substituted phenol as just prepared. 0.61 g of 1,6-hexanediamine and 0.35 g of formaldehyde are then added to the flask at 30° C. under nitrogen. The mixture is heated to 115° C. and kept at that temperature for 1 hour, after which the temperature of the reaction mixture is raised to 130° C. and maintained at that temperature for 45 min., all the while sweeping the reaction flask with dry nitrogen gas. The stripped reaction mixture is then cooled to room temperature, diluted with 100 ml of heptane, and filtered. The filtrate is then stripped at 130° C. with dry nitrogen gas to remove heptane.

EXAMPLE 9

A 1500-ml glass reactor equipped with gas inlet and outlet tubes, a thermometer, and a stirrer is charged with 800 grams of EB copolymer as prepared in Example 3. The temperature is raised to 200° C. while stirring the copolymer. Dry air is bubbled through the copolymer via the inlet tube for 6 hrs., all the while maintaining the temperature at 200° C. At the end of 6 hrs., the air flow is terminated, and nitrogen is bubbled through the copolymer while cooling the reactor to room temperature; an oxidized EP copolymer product is obtained.

EXAMPLE 10

A nitrogen-containing dispersant material is prepared utilizing oxidized EB copolymer product as prepared in Example 9. The oxidized EB copolymer is dissolved in an equal amount by weight of S150NL mineral oil. To the polymer solution is added tetraethylene pentamine (TEPA), and the mixture is heated to 140° C. under nitrogen while stirring for about 2 to 4 hrs. The molar ratio of total polymer to polyamine in terms of equivalents of carboxyl groups in the oxidized EB copolymer to TEPA charged is 2 to 1.

EXAMPLE 11

In a continuous polymerization, purified compressed ethylene and butene-1 were continuously supplied into a 750 L shafted and baffled steel autoclave with a 6:1 length to diameter ratio and five reaction zones. The catalyst system of Example 1, but in an Al:Zr mol. ratio of 1000:1, was continuously pumped into the stirred (about 2000 rpm) reaction vessel at 20,000 psi (about 1350 bar) and 300° C. The residence time was about 1–2 min. and unreacted ingredients were transported via a recycle loop through a cooler and compressor back to the autoclave reactor together with fresh monomers to replace the consumed amounts. A feed of about 90 mole % ethylene resulted in polymer with about 50 wt. % butene-1 incorporation at a rate of 2750 lb./hr.

Reaction pressures varied only mildly, reactor exit temperature ranged from about 300° F. (149° C.) to about 370° F. (188° C.) depending on target $\overline{M}_n$ desired, and the feed ratio was varied somewhat to provide liquid ethylene/butene copolymers. Numerous samples were analyzed by proton NMR and $C^{13}$ NMR for olefinic unsaturation by type, ethylene content, and $\overline{M}_n$. The $\overline{M}_n$'s ranged from 1060–6038 and ethylene content ranged from 17.3–68.7 wt. %. Unsaturation types varied as follows: vinyl: 1.3–17.6% (of total unsaturation); disubstituted (vinylene): 4.0–12.0%; trisubstituted: 35.4–67.4%; and vinylidene: 19.7–54.0%.

Exemplary polymers include the following:

| $\overline{M}_n$ | Wt. % $C_2$ | Vinyl | Di | Tri | Vinylidene |
|---|---|---|---|---|---|
| 6038 | 68.7 | 14.5 | 10.9 | 52.0 | 22.5 |
| 2700 | 51.3 | 2.5 | 10.3 | 67.4 | 19.7 |
| 1060 | 17.3 | 1.3 | 4.0 | 40.7 | 54.0 |
| 4324 | 60.5 | 17.6 | 12.0 | 50.0 | 20.5 |
| 4764 | 31.7 | 11.0 | 7.4 | 35.4 | 46.2 |
| 4858 | 23.7 | 1.5 | 7.6 | 41.2 | 49.7 |

The last sample compares favorably to the polymer of Example 1 in that polymers very similar in $\overline{M}_n$ and ethylene content can readily be made to vary on trisubstituted content (compare 41.2% to about 22–29% in the Example 1 polymer).

We claim:

1. An unsaturated polymer composition of a $C_4$ to $C_8$ α-olefin, wherein at least about 10 percent of the polymer unsaturation has three hydrocarbyl substituents on the two carbons of olefinic unsaturation.

2. The polymer composition of claim 1 wherein at least about one third of the polymer unsaturation has three hydrocarbyl substituents on the two carbons of olefinic unsaturation.

3. The polymer composition of claim 1 wherein at least about 40% of the polymer unsaturation has three hydrocarbyl substituents on the two carbons of olefinic unsaturation.

4. The polymer composition of claim 1 wherein said olefinic unsaturation is a terminal unsaturation.

5. The polymer of claim 4 terminated with an olefin structure

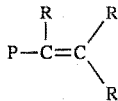

wherein P is the polymer chain and at least two R's are hydrocarbyl and the third R is H or hydrocarbyl.

6. The polymer of claim 1, wherein said polymer is copolymer wherein the comonomer is selected from the group consisting of ethylene, propylene and hexene-1.

7. The polymer of claim 6 wherein said copolymer is an interpolymer of ethylene and a $C_4$ to $C_8$ α-olefin.

8. The polymer of claim 1 produced by metallocene catalyst system polymerization.

9. The polymer of claim 1 wherein said polymer is amorphous.

10. The polymer of claim 9 wherein said polymer is liquid.

11. The polymer of claim 1 having $\overline{M}_n$ of about 300–20,000.

12. A lubricating basestock composition comprising as a part of said basestock, the unsaturated polymer composition of claim 1.

13. A process for modifying the polymer of claim 1 comprising reacting said polymer so as to consume or isomerize said olefinic unsaturation.

14. The process of claim 13 wherein said polymer is reacted to consume said olefinic unsaturation in an addition reaction.

15. The process of claim 13 wherein said polymer is reacted to isomerize said olefinic unsaturation in an ene reaction.

16. A dispersant or viscosity modifier prepared by functionalizing a polymer of claim 1.

17. A dispersant or viscosity modifier of claim 16 functionalized with a carboxylic acylating agent, optionally derivatized with a nucleophilic agent.

18. The polymer composition of claim 1 wherein said polymer composition has at least about 30% of its polymer chains unsaturated.

19. The polymer composition of claim 18 wherein said at least about 30% of its polymer chains are terminally unsaturated.

20. An oil or fuel containing the composition of claim 1 or containing a dispersant or viscosity modifier prepared therefrom.

21. A process for producing the unsaturated polymer compositions of claim 1 comprising polymerizing a $C_4$ or higher α-olefin with a metallocene catalyst system.

* * * * *